United States Patent
Khabashesku et al.

(10) Patent No.: US 7,740,826 B2
(45) Date of Patent: Jun. 22, 2010

(54) METHOD FOR FUNCTIONALIZING CARBON NANOTUBES UTILIZING PEROXIDES

(75) Inventors: Valery N. Khabashesku, Houston, TX (US); Haiqing Peng, Houston, TX (US); John L. Margrave, Bellaire, TX (US); Mary Lou Margrave, legal representative, Bellaire, TX (US); Wilbur Edward Billups, Houston, TX (US); Yunming Ying, Houston, TX (US)

(73) Assignee: William Marsh Rice University, Houston, TX (US)

( * ) Notice: Subject to any disclaimer, the term of this patent is extended or adjusted under 35 U.S.C. 154(b) by 705 days.

(21) Appl. No.: 11/585,368

(22) Filed: Oct. 24, 2006

(65) Prior Publication Data

US 2007/0098620 A1    May 3, 2007

Related U.S. Application Data

(62) Division of application No. 10/714,014, filed on Nov. 14, 2003, now Pat. No. 7,125,533.

(60) Provisional application No. 60/426,784, filed on Nov. 15, 2002, provisional application No. 60/483,817, filed on Jun. 30, 2003.

(51) Int. Cl.
*D01F 9/12* (2006.01)
*C09C 1/56* (2006.01)

(52) U.S. Cl. .................... 423/447.1; 423/460; 977/745; 977/748

(58) Field of Classification Search .................. None
See application file for complete search history.

(56) References Cited

U.S. PATENT DOCUMENTS

2003/0086858 A1* 5/2003 Niu et al. .................. 423/447.1

(Continued)

FOREIGN PATENT DOCUMENTS

WO    WO 98/39250    9/1998

(Continued)

OTHER PUBLICATIONS

Kirk-Othmer; Encyclopedia of Chemical Technology; Peroxides and Peroxide Compounds, Organic Peroxides; 1996.*

(Continued)

*Primary Examiner*—Melvin C Mayes
*Assistant Examiner*—Guinever S Gregorio
(74) *Attorney, Agent, or Firm*—Winstead PC

(57) ABSTRACT

A method for functionalizing the wall of single-wall or multi-wall carbon nanotubes involves the use of acyl peroxides to generate carbon-centered free radicals. The method allows for the chemical attachment of a variety of functional groups to the wall or end cap of carbon nanotubes through covalent carbon bonds without destroying the wall or endcap structure of the nanotube. Carbon-centered radicals generated from acyl peroxides can have terminal functional groups that provide sites for further reaction with other compounds. Organic groups with terminal carboxylic acid functionality can be converted to an acyl chloride and further reacted with an amine to form an amide or with a diamine to form an amide with terminal amine. The reactive functional groups attached to the nanotubes provide improved solvent dispersibility and provide reaction sites for monomers for incorporation in polymer structures. The nanotubes can also be functionalized by generating free radicals from organic sulfoxides.

25 Claims, 12 Drawing Sheets

U.S. PATENT DOCUMENTS

2004/0009114 A1* 1/2004 Margrave et al. ......... 423/447.1
2004/0202603 A1* 10/2004 Fischer et al. ............ 423/447.2

FOREIGN PATENT DOCUMENTS

| WO | WO 00/17101 | 3/2000 |
|---|---|---|
| WO | WO 02/16257 | 2/2002 |
| WO | WO 02/064868 | 8/2002 |
| WO | WO 02/064869 | 8/2002 |

OTHER PUBLICATIONS

Mickelson, E.T., et al., "Fluorination of single-wall carbon nanotubes", Chem. Phys. Lett. 296 (1998), pp. 188-194.

Boul, P.J., et al., "Reversible sidewall functionalization of buckytubes", Chem. Phys. Lett. 310 (1999), pp. 367-372.

Saini, R.K., et al., "Covalent Sidewall Functionalization of Single Wall Carbon Nanotubes", J. Am. Chem. Soc. 125 (2003), pp. 3617-3621.

Mickelson, E.T., et al., "Solvation of Fluorinated Single-Wall Carbon Nanotubes in Alcohol Solvents", J. Phys. Chem. B., vol. 103 (1999), pp. 4318-4322.

Khabashesku, V.N., et al., "Fluorination of Single-Wall Carbon Nanotubes and Subsequent Derivatization Reactions", Acc. Chem. Res. 35 (2002) pp. 1087-1095.

Khabashesku, V.N., et al., "Chemistry of carbon nanotubes", vol. 1, The Encyclopedia of Nanoscience and Nanotechnology, S. Nalwa, Ed., American Scientific Pub. (2004), pp. 1-47.

Stevens, J.L., et al., "Sidewall Amino-Functionalization of Single-Wall Carbon Nanotubes through Fluorination and Subsequent . . . ", Nano Lett. 3 (2003), pp. 331-336.

Bahr, J.L., et al., "Functionalization of Carbon Nanotubes by Electrochemical Reduction of Aryl Diazonium Salts: A . . . ", J. Am. Chem. Soc. 123 (2001), pp. 6536-6542.

Georgakilas, V., et al., "Organic Functionalization of Carbon Nanotubes", J. Am. Chem. Soc. 124 (2002), pp. 760-761.

Georgakilas, V., et al., "Purification of HiPCO Carbon Nanotubes via Organic Functionalization", Chem. Commun. (2002), pp. 14318-14319.

Pantarotto, D., et al., "Synthesis, Structural Characterization, and Immunological Properties of Carbon Nanotubes . . . ", J. Am. Chem. Soc. 125 (2003), pp. 6160-6164.

Chen, Y., et al., "Chemical attachment of organic functional groups to single-walled carbon nanotube material", J. Mater. Res. 13 (1998), pp. 2423-2431.

Chen, J., et al, "Solution Properties of Single-Walled Carbon Nanotubes", Science 282 (1998), pp. 95-98.

Holzinger, M., et al., "Sidewall Functionalization of Carbon Nanotubes", Angew. Chem. Int. Ed. 40 (2001), pp. 4002-4005.

Peng, H., et al., "Sidewall functionalization of single-walled carbon nanotubes with organic peroxides", Chem. Commun. (2003), pp. 362-363.

Ying, Y., et al., "Functionalization of Carbon Nanotubes by Free Radicals", Org. Lett. 5 (2003), pp. 1471-1473.

Kini, V.U., et al., "Two new synthetic routes to polyhydroxylated nanotubes", Rice Quantum Institute Sixteenth Annual Summer Research Colloquium (Aug. 9, 2002), Abtr. p. 25.

Bahr, J.L., et al., "Highly Functionalized Carbon Nanotubes Using in Situ Generated Diazonium Compounds", Chem. Mater. 13 (2001), pp. 3823-3824.

Kooi, S.E., et al., "Electrochemical Modification of Single Carbon Nanotubes", Angew. Chem. Int. Ed. 48 (2002), pp. 1353-1355.

Tagmatarchis, N., et al., "Sidewall functionalization of single-walled carbon nanotubes through electrophilic addition", Chem. Commun. (2002), pp. 2010-2011.

Pekker, S., et al., "Hydrogenation of Carbon Nanotubes and Graphite in Liquid Ammonia", J. Phys. Chem. B. 105 (2001), pp. 7938-7943.

Fontana, F., et al., "New General and Convenient Sources of Alkyl Radicals, Useful for Selective Syntheses", Tetrahedron Lett. 29 (1988), pp. 1975-1978.

Chiang, I.W., et al., "Purification and Characterization of Single-Wall Carbon Nanotubes (SWNTs) Obtained from the Gas-Phase . . . ", J. Phys. Chem. B 105 (2001), pp. 8297-8301.

Arndt, S., et al., "Quinone—Annonaceous Acetogenins: Synthesis and Complex I Inhibition Studies of a New Class of Natural . . . ", Chem. Eur. J. 7 (2001), pp. 993-1005.

Gu, Z., et al., "Cutting Single-Wall Carbon Nanotubes through Fluorination", Nano Lett. 2 (2002), pp. 1009-1013.

Clover, A.M., et al, "The Action of Hydrogen Peroxide Upon Anhydrides and the Formation of Organic Acid, Peroxides, and Peracids", 32 (1904), pp. 43-68.

* cited by examiner

4a. R= -(CH$_2$)$_{17}$CH$_3$

4b. R= -(CH$_2$)$_3$CH$_3$

4c. R= -CH(CH$_3$)CH$_2$CH$_3$

4d. R= -CH$_2$CONH$_2$

4e. R= -(CH$_2$)$_3$Cl

4f. R= -CH$_2$CN

4g. R= -(CH$_2$)$_3$-O-THP

4h. R= -CH$_2$COOCH$_2$CH$_3$

4i. R= -(CH$_2$CH$_2$O)$_n$CH$_2$CH$_2$CH$_2$CH$_3$ (n ≈ 3)

4j. R= -CH$_2$C(CH$_3$)$_3$

5a. R, R'= -CH$_3$

5b. R, R'= -CH$_2$CH$_2$CH$_3$

5c. R, R'= -CH(CH$_3$)$_2$

5d. R, R'= -CH$_2$CH$_2$CH$_2$CH$_3$

5e. R, R'= -CH(CH$_3$)CH$_2$CH$_3$

5f. R, R'= -Ph

SWNT-(CH$_2$CH$_2$CONHCH$_2$CH$_2$NH$_2$)$_x$
8

Time (minute)

Chemical Shift (ppm)

METHOD FOR FUNCTIONALIZING CARBON NANOTUBES UTILIZING PEROXIDES

CROSS-REFERENCE TO RELATED APPLICATIONS

The present application is a divisional of U.S. patent application Ser. No. 10/714,014, filed Nov. 14, 2003, which claims priority to the following U.S. Provisional Patent Applications: Ser. No. 60/426,784, filed Nov. 15, 2002, and Ser. No. 60/483,817, filed Jun. 30, 2003, all of which are incorporated herein by reference.

This invention was made with support from the Robert A. Welch Foundation (Grant Nos. C-0109), the Texas Higher Education Coordinating Board's Advanced Technology Program (Grant Nos. 003604-0026-2001), and the National Science Foundation, Grant No. CHE-0450085.

FIELD OF THE INVENTION

This invention relates generally to carbon nanotubes, particularly the functionalization of carbon nanotubes, and more particularly to a method for functionalizing the wall of carbon nanotubes utilizing peroxides.

BACKGROUND OF THE INVENTION

Since their discovery in 1993, single-walled carbon nanotubes (SWNT) have become an area of wide-reaching research and development activity due to their exceptional chemical and physical properties, including high strength, stiffness, and thermal and electrical conductivity. SWNT are hollow, tubular fullerene molecules consisting essentially of $sp^2$-hybridized carbon atoms typically arranged in hexagons and pentagons. Single-wall carbon nanotubes typically have diameters in the range of about 0.5 nanometers (nm) and about 3.5 nm, and lengths usually greater than about 50 nm.

Multi-wall carbon nanotubes are nested single-wall carbon cylinders and possess some properties similar to single-wall carbon nanotubes. However, since single-wall carbon nanotubes have fewer defects than multi-wall carbon nanotubes, single-wall carbon nanotubes are generally stronger and more conductive.

There is considerable interest in the chemical modification of single-wall carbon nanotubes to take advantage of single-wall carbon nanotubes' remarkable tubular framework structure in various applications, particularly, in the engineering of multi-functional materials. SWNT derivatized with organic functional groups can provide a high binding affinity and selectivity through formation of either hydrogen or covalent bonds. Through functionalization, SWNT can exhibit improved solubility in common organic solvents, as well as improved material properties and processability of composites, including fibers and nanotube-reinforced composite materials, such as those based on organic and inorganic polymers. SWNT that have been chemically derivatized with hydrophilic substituents, such as those containing terminal hydroxyl or carboxylic acid groups, are particularly attractive for medical and biological applications.

Exohedral SWNT functionalization can generally be classified into three main categories: 1) non-covalently bonded, supramolecular complexation, wrapping and coating with detergents and polymers, such as given in International Patent Publication, "Polymer-wrapped Single-wall Carbon Nanotubes" WO 02/016257 published Feb. 28, 2002, incorporated herein by reference in its entirety; 2) generation and functionalization of open and closed tube ends, such as given in International Patent Publication, "Carbon Fibers formed from Single-wall Carbon Nanotubes, WO 98/39250 published Sep. 11, 1998, incorporated herein by reference in its entirety; and 3) direct chemical functionalization of the nanotube sidewalls using addition reactions, such as given in "Chemical Derivatization of Single-Wall Carbon Nanotubes to Facilitate Solvation Thereof; and Use of Derivatized Nanotubes," WO 00/17101 published Mar. 30, 2000, incorporated herein by reference in its entirety.

Of the two chemically-bonded functionalization categories, the functionalization referred to as "end-derivatization," or "end-functionalized" will be defined herein to include bonds on edges and open tube ends. "Sidewall derivatization" or "sidewall functionalization" will be defined herein to include bonds made to the wall that keep the carbon-carbon bonds of the wall intact. "End-cap derivatization" or "end-cap functionalization" will be defined herein to include bonds made to the end cap that keep the carbon-carbon bonds of the end cap intact. Regardless of whether the single-wall carbon nanotubes are derivatized on their ends, sides, end caps, or combination thereof, the SWNT will be referred to as derivatized SWNT for convenience and clarity.

End-functionalization of single-wall carbon nanotubes often proceeds through oxidation routes to form shortened nanotubes with carboxylic acid groups at the tube ends which can be further derivatized by reactions with a chlorinating agent, such as thionyl chloride, and long-chain amines or by esterification. Carboxylic acid functionality can also be created on SWNT edges and defects on partially etched ("unzipped") side walls by oxidative treatment with various oxidants.

Sidewall functionalization of carbon nanotubes, in which the nanotube walls are kept intact, has been much more difficult to achieve than open end-functionalization. Methods to functionalize SWNT sidewalls with organic groups include fluorination (see E. T. Mickelson, et al., Chem. Phys. Lett. 1998, 296, 188), followed by subsequent reactions with reactions with alkyl lithium and metal alkoxides (see P. J. Boul et al., Chem. Phys. Lett. 1999, 310, 367, R. K. Saini, et al., J. Am. Chem. Soc. 2003, 125, 3617, and E. T. Mickelson, et al., J. Phys. Chem. B, 1999, 103, 4318-4322), as well as by Grignard reagents (see V. N. Khabashesku, et al, Acc. Chem. Res. 2002, 35, 1087, and Khabashesku, V. N. and Margrave, J. L. "Chemistry of Carbon Nanotubes" in The Encyclopedia of Nanoscience and Nanotechnology, S. Nalwa, Ed. American Scientific Publ. 2003) or diamines (see J. L. Stevens, et al., Nano Lett. 2003, 3. 331) and reactions with aryl diazonium salts (see J. L. Bahr, et. al., J. Am. Chem. Soc. 2001, 123, 6536-6542 "Bahr"), azomethine ylides (see V. Georgakilas, et al., J. Am. Chem. Soc. 2002, 124, 760; V. Georgakilas, et al., J. Chem. Soc. Chem. Commun. 2002, 3050; D. Pantarotto, et al., J. Am. Chem. Soc. 2003, 125, 6160); carbenes (see Y. Chen, et al., J. Mat. Res. 1998, 13, 2423-2431, J. Chen, et al., Science, 1998, 282, 95-98, and M. Holzinger, et al, Angew. Chem. Int. Ed. 2001, 40, 4002-4005 ("Holzinger")); nitrenes (see Holzinger) and organic radicals (see Holzinger, H. Peng, et al., J. Chem. Soc. Chem. Commun, 2003, 362, and Y. Ying, et al., Org. Lett. 2003, 9, 1471).

One method of functionalizing fullerenes with moieties having terminal carboxylic acid groups has been demonstrated with $C_{60}$ using a two-step process (Bingel 2+1 cycloaddition reaction followed by deesterification) yielding carboxylated methanofullerene structures. (see Kini V. U.; Khabashesku, V. N.; Margrave, J. L. Rice Quantum Institute Sixteenth Annual Summer Research Colloquium. Aug. 9, 2002, Abstr. p. 25.) However, when applied to single-wall carbon nanotubes, the process was much less efficient due to the inertness of single-wall carbon nanotube to carbene addition via Bingel-type reaction.

Sidewall functionalization of single-wall carbon nanotubes with aryl radicals has been reported when aryl diazonium salts were reduced electrochemically using single-wall carbon nanotube buckypaper as electrodes. (see Bahr). Functionalization has also been reported using diazonium compounds generated in situ. (see J. L. Bahr, et al., *Chem. Mater.* 2001, 13, 3823-3824). Radical addition of perfluoroalkyl groups generated by photolysis of corresponding species possessing a carbon-iodine bond has also been reported by Holzinger. Other examples of sidewall functionalization include electrochemical reductive and oxidative coupling by substituted phenylated derivatives (see S. E. Kooi et al., *Angew. Chem. Int. Ed.*, 2002, 41, 1353-1355) and electrophilic addition of chloroform followed by hydrolysis and esterification (see N. Tagmatarchis, et al., *Chem. Commun.*, 2002, 2010-2011). Dissolved lithium metal in liquid ammonia (Birch reduction) was used to hydrogenate SWNT. (see S. Pekker, et al., *J. Phys. Chem. B.*, 2001, 105, 7938-7943.)

There remains, however, a need for a convenient and efficient method for non-destructively functionalizing single-wall carbon nanotubes with a variety of functional groups, especially organic groups which can be used for further reactions, so as to be bound or otherwise associated with polymers, biomedical species, and other materials for a particular end-use application.

SUMMARY OF THE INVENTION

In one embodiment, the present invention involves a convenient, economical method for non-destructively functionalizing the sidewall of single-wall carbon nanotubes (SWNT) or fluorinated single-wall carbon nanotubes utilizing peroxides. In one embodiment, the method for sidewall functionalizing a single-wall carbon nanotube comprises decomposing a diacyl peroxide in the presence of carbon nanotubes wherein the decomposition generates carbon-centered free radicals that react and form covalently bonds with carbon in the single-wall carbon nanotube wall to form a single-wall carbon nanotube sidewall functionalized with at least one organic group through a carbon bond to the nanotube. An acyl peroxide, also known as a diacyl peroxide, is a compound with a structure of the type RC(O)OOC(O)R', where R and R' groups can be either alkyl or aryl. In one embodiment, the acyl peroxide is an aroyl peroxide wherein the R or R' group comprises an aromatic component. In another embodiment, the acyl peroxide is an aroyl peroxide and comprises benzoyl peroxide, which, upon decomposition, liberates carbon dioxide and generates phenyl radicals that attach to the sidewalls of the nanotubes to form sidewall phenylated single-wall carbon nanotubes.

In an embodiment of the present invention, the acyl peroxide is a peroxydicarbonate. A peroxydicarbonate is an acyl peroxide wherein the R and R' are alkoxy groups. In another embodiment, the acyl peroxide has terminal carboxylic acid groups. Examples of acyl peroxides with terminal carboxylic acid groups include, but are not limited to, succinic acid peroxide and glutaric acid peroxide. In this embodiment, the peroxide decomposes, liberating carbon dioxide and forming carbon-centered free radicals that attach to the sidewalls of the nanotubes and provide organic groups with terminal carboxylic acid functionality that are then available for further reaction. An example of further reactions with a carboxylic acid functional group include, but are not limited to, reaction with a chlorinating agent (such as thionyl chloride) to form an acylchloride and further reaction of the acylchloride with an amine to form an amide or a diamine to form a amide linkage with a terminal amine group.

Suitable peroxides for use with this invention include, but are not limited to, acyl peroxides, wherein the R and R' organic groups can be the same or different. When the R and R' groups are the same, the acyl peroxide is a symmetrical peroxide. When the R and R' groups are different, the acyl peroxide is an asymmetrical peroxide. The R and R' organic groups of the acyl peroxide can comprise R and R' groups of the form including, but not limited to, alkyl, cyclic, aryl and combinations thereof.

In one embodiment, the method involves generating a phenyl radical, such as through the decomposition of the acyl peroxide, benzoyl peroxide, and reacting the phenyl radical with an organic iodide to generate a carbon-centered radical from the organic group that was bonded to the iodine. The organic group can be alkyl or aryl. When the organic group is an alkyl, the alkyl radical reacts with the single-wall carbon nanotube to form a covalent bond with the sidewall of the single-wall carbon nanotube to form a sidewall-alkylated single-wall carbon nanotube. The alkyl iodide can comprise various alkyl groups, including, but not limited to, a hydrocarbon alkyl group, an alkyl amide, an alkyl amine, alkyl halide, an alkyl cyanide, an alkyl ether, an alkyl thioether, a trialkyl phosphine, an alkyl carboxylic acid, an alkyl carboxylate and combinations thereof. Generally, the number of carbons in the alkyl group of the alkyl iodide is in the range of 1 to about 30. All radicals attach by a carbon linkage to the carbon nanotube.

In another embodiment, carbon-centered free radicals can be generated from hydroxyl radicals and organic sulfoxides. In this embodiment, hydroxyl radicals are formed from Fenton's reagent, wherein hydrogen peroxide and divalent iron react. The hydroxyl radicals further react with an organic sulfoxide of the form R—S(O)—R', to form .R and .R' carbon-centered free radicals. The .R and .R' free radicals then react with single-wall carbon nanotubes and bond to the sidewall to form single-wall carbon nanotubes with R and R' groups attached to their sidewall. R and R' can be the same or different. The R and R' groups can also be aryl groups, such as, but not limited to phenyl groups and other aromatic groups. The reaction generates carbon-centered free radicals from an organic sulfoxide and will be referred to as a "Minisci" or "Minisci-type" reaction. The carbon-centered free radicals can be generated from the organic sulfoxide using Fenton's reagent, which generates hydroxyl radicals from the reaction of hydrogen peroxide and an Fe(II) catalyst, such as $FeSO_4$.

The method of this invention applies to both single-wall and multi-wall carbon nanotubes to functionalize the exterior wall of the carbon nanotube without destroying the carbon wall structure. Besides pristine, underivatized nanotubes, sidewall-fluorinated carbon nanotubes can also be used as the initial nanotubes for further sidewall derivatization. Although not meant to be bound by theory, the presence of sidewall fluorine groups appears to make the nanotubes more reactive to sidewall derivatization.

Certain properties of the nanotubes can be imparted to other materials more effectively when the nanotubes have sidewall functionality. The sidewall-functionalized nanotubes can be made more compatible and dispersible in other materials. In one embodiment, the non-destructive sidewall functionalization of single-wall carbon nanotubes enables the incorporation of the nanotubes into composite materials by reacting with an appropriate functionality attached to the sidewall of the single-wall carbon nanotube. In another embodiment, the sidewall functionalization of single-wall carbon nanotubes with aromatic groups or long chain alkyl groups, oligomers, or polymers can make the single-wall carbon nanotubes more compatible with various materials, such as, but not limited to, polymers and other organic materials, and enable composites with high dispersability and enhancement of the materials' properties. Because the structure of the nanotubes is still intact after the sidewall functionalization, the mechanical properties of the nanotubes can contribute to the strength and modulus of the composite materials.

BRIEF DESCRIPTION OF THE DRAWINGS

FIG. 3 shows a reaction scheme of one embodiment of the present invention wherein hydrogen peroxide in the presence of $Fe^{+2}$ forms a hydroxyl free radical. The radical is further reacted with dimethyl sulfoxide to form a methyl radical. The methyl radical attaches to the SWNT sidewall to form sidewall-methylated-SWNT 5a.

FIG. 11A for pristine SWNT;
FIG. 11B for SWNT-$(CH_2CH_2COOH)_x$;
FIG. 11C for SWNT-$(CH_2CH_2CH_2COOH)_x$;
and
FIG. 11D for SWNT-$(CH_2CH_2COOH)_x$ after heating to 800° C. in argon per TGA.

FIG. 12A for SWNT-$(CH_2CH_2COOH)_x$;
FIG. 12B for SWNT-$(CH_2CH_2CONHCH_2CH_2NH_2)_x$;
FIG. 12C for SWNT-$(CH_2CH_2CONHC_6H_{10}CH_2C_6H_{10}NH_2)_x$;
and
FIG. 12D for SWNT-$(CH_2CH_2CONHC_6H(C_2H_5)_2CH_3NH_2)_x$.

FIG. 14A for pristine HIPCO SWNT;
FIG. 14B for SWNT-$(CH_2CH_2CH_2COOH)_x$;
FIG. 14C for SWNT-$(CH_2CH_2COOH)_x$;
and
FIG. 14D for SWNT-$(CH_2CH_2CONHCH_2CH_2NH_2)_x$.

DETAILED DESCRIPTION OF SPECIFIC EMBODIMENTS OF THE INVENTION

Figure 1:
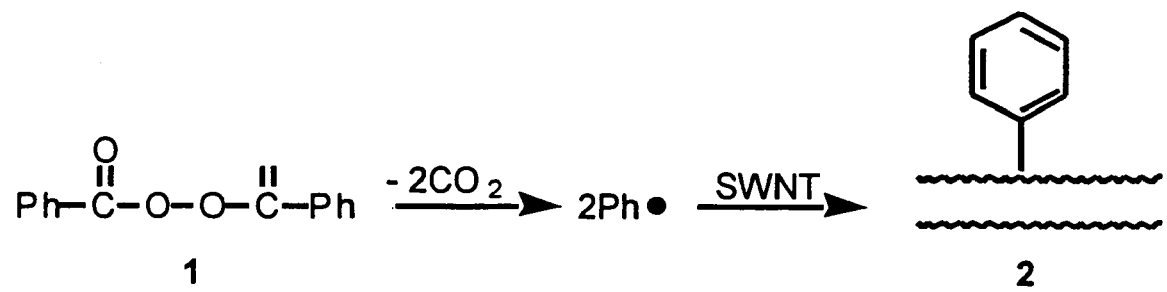
FIG. 1 shows a reaction of one embodiment of the present invention wherein benzoyl peroxide 1 is used to functionalize the sidewall of a single-wall carbon nanotube (SWNT) and form sidewall-phenylated-SWNT 2.

The carbon nanotubes, according to the present invention, can be made by any known method. Single-wall carbon nanotubes are generally made in high-temperature processes using a carbon source and a metallic catalyst, typically comprising Group VIb and/or Group VIIIb transition metals. Methods for synthesizing single-wall carbon nanotubes include DC arc processes; laser vaporization of graphite doped with transition metal atoms; high temperature, high pressure gas-phase syntheses involving a carbon-containing feedstock gas, such as carbon monoxide; and a volatile transition metal catalyst precursor, and chemical vapor deposition (CVD) processes in which single-wall carbon nanotubes are formed from a carbon-containing gas on nanometer-scale metal catalyst particles, which can be supported on a substrate or catalyst support. The process type and operating conditions will produce single-wall carbon nanotubes having a particular distribution of diameters and lengths. Generally, the lengths of as-produced single-wall carbon nanotubes are in excess of about 50 nm, and more typically, greater than about 100 nm. Commonly, single-wall carbon nanotubes have lengths in the range of about 1 and about 10 microns.

All known methods of synthesizing single-carbon nanotubes also produce a distribution of reaction products, including, but not limited to, single-wall carbon nanotubes, amorphous carbon, metallic catalyst residues, and, in some cases, multi-wall carbon nanotubes. The distribution of reaction products will vary depending on the process and the operating conditions used in the process.

The nanotubes can be optionally purified. In one embodiment, single-wall carbon nanotube powder is purified to remove non-nanotube carbon, such as amorphous carbon and metallic catalyst residues. Metals, such as Group VI and/or VIII are possible catalysts for the synthesis of single-wall carbon nanotubes, and the metallic residues after catalysis may be encapsulated in non-nanotube carbon, such as graphitic shells of carbon. The metallic impurities may also be oxidized through contact with air or by oxidation of the non-nanotube carbon during purification.

Purification can be done by any known means. Procedures for purification of carbon nanotubes are related in International Patent Publications "Process for Purifying Single-Wall Carbon Nanotubes and Compositions Thereof," WO 02/064,869 published Aug. 22, 2002, and "Gas Phase Process for Purifying Single-Wall Carbon Nanotubes and Compositions Thereof," WO 02/064,868 published Aug. 22, 2002, and incorporated by reference herein in their entirety. In an embodiment of the present invention, the nanotubes are purified by heating at 250° C. in air saturated with water vapor. The heating is done for a length of time so as to oxidize at least some of the non-nanotube carbon, and, may, to some extent, oxidize the metal impurities. The oxidation temperature can be in the range of about 200° C. to about 400° C., preferably about 200° C. to about 300° C. The oxidation can be conducted in any gaseous oxidative environment, which can comprise such oxidative gases as such as oxygen, air, carbon dioxide, and combinations thereof. The concentration of the oxidative gases can be adjusted and controlled by blending with nitrogen, an inert gas, such as argon, or combinations thereof. The duration of the oxidation process can range from a few minutes to days, depending on the oxidant, its concentration, and the oxidation temperature.

After oxidatively heating the nanotubes, the nanotubes are treated with acid to remove metallic impurities and to form a slurry of nanotubes in the acid. The acid can be a mineral acid, an organic acid, or combinations thereof Examples of acids that could be used to treat and slurry the nanotubes include, but are not limited to, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and combinations thereof. The acid used can be a pure acid or diluted with a liquid medium, such as an aqueous and/or organic solvent. Generally, an aqueous solvent is preferred. Concentrated aqueous hydrochloric acid is preferred for removing metallic impurities.

After the metallic impurities react with the acid, the nanotubes are filtered and washed to remove the acid from the nanotubes. Examples of washing media that could be used to wash the acid from the nanotubes include, but are not limited to, water, alcohols, aldehydes, ketones, dilute alkaline solutions, ammonium hydroxide, primary, secondary and tertiary amines, oxygenated hydrocarbons, hydroxylated hydrocarbons, organic aromatics and combinations thereof.

After the nanotubes are washed, they can, optionally, be dried, such as in a vacuum oven or an inert environment, such as in nitrogen or an inert gas atmosphere, with or without heat.

Furthermore, the single-wall carbon nanotubes can, optionally, be sidewall fluorinated. Sidewall fluorinated single-wall carbon nanotubes are designated "F-SWNT" herein. F-SWNT can be prepared, preferably with purified single-wall carbon nanotubes, by direct fluorination using such procedures as given in Z. Gu, et al., *Nano Lett.*, 2002, 2, 1009. The SWNT can be fluorinated to any level up to the theoretical limit of one fluorine to two carbon atoms on the SWNT and still have the wall structure intact. The stoichiometry of maximum SWNT fluorination is $C_2F$.

Sidewall Functionalization of Carbon Nanotubes Utilizing Acyl and Aroyl Peroxides In one embodiment of the present invention, the decomposition of acyl peroxides is used to generate carbon-centered free radicals, which non-destructively add organic groups through a carbon linkage to the sidewall and/or closed end cap of a carbon nanotube.

Acyl peroxides, or alternatively, diacyl peroxides, have the chemical formula R—C(O)O—O(O)C—R'. The O—O bond is very weak and under suitable conditions, the O—O bond can readily undergo bond homolysis to form an intermediate carboxyl radical which decarboxylates to produce carbon dioxide and carbon-centered radicals, such as .R, .R', or a combination thereof. The R and R' groups can be the same or different. The R and R' can be alkyl, aryl, or cyclic. In addition, the R and R' groups can have terminal functional groups and contain heteroatoms, other than carbon and hydrogen. Acyl peroxides are conveniently and economically available, or can be synthesized, with a wide variety of R and R' groups.

In one embodiment of the present invention, an alkyl group, such as an undecyl ($C_{11}H_{23}$) group can be bonded to the sidewalls of single-wall carbon nanotubes using undecyl groups generated by the decomposition of the acyl peroxide, also known as lauroyl peroxide ($C_{11}H_{23}$—C(O)OO(O)C—$C_{11}H_{23}$). Lauroyl peroxide is also known by other nomenclature, such as, but not limited to, dilauroyl peroxide and dodecanoyl peroxide. The procedures for attaching alkyl groups to the sidewall of the nanotube comprise, making a suspension of nanotubes in a suitable solvent, such as benzene. Sonication, stirring and other means of agitation can be used to facilitate dispersion of the nanotubes. The acyl peroxide is then added to the SWNT suspension. The nanotubes and peroxide are heated to a temperature above the decomposition temperature of the acyl peroxide and mixed for a time effective to decompose the peroxide, generate free carbon-centered radicals and bond the free radicals to the sidewalls of the carbon nanotubes.

Examples of other suitable acyl peroxides of the form R—C(O)O—O(O)C—R', wherein the R and R' are organic groups that can be the same or different and can include, but are not limited to, acetyl peroxide, n-butyryl peroxide, sec-butyryl peroxide, t-butyryl peroxide, t-pentoyl peroxide, isovaleryl peroxide, furoyl peroxide, palmitoyl peroxide, decanoyl peroxide, lauroyl peroxide, diisopropyl peroxydicarbonate and butylperoxyisopropyl carbonate. The R or R' group can comprise a normal, branched or cyclic alkyl group wherein the number of carbons can range from one to about 30, and typically, in the range of about 8 and about 20. The R or R' group can contain one or more cyclic rings, examples of which are trans-t-butylcyclohexanoyl peroxide, trans-4-cyclohexanecarbonyl peroxide and cyclohexyl peroxydicarbonate, cyclopropanoyl peroxide, cyclobutanoyl peroxide and cyclopentanoyl peroxide. The acyl peroxides can contain heteroatoms and functional groups, such as bromobutyryl peroxide, $(CCl_3CO_2)_2$, $(CF_3CO_2)_2$, $(CCl_3CO_2)_2$, $(RO(CH_2)_n CO_2)_2$, $(RCH=CR'CO_2)_2$, $(RC\equiv CCO_2)_2$, and $(N\equiv C(CH_2)_n CO_2)_2$, where n=1-3.

The degree of functionalization of the nanotube will depend on various factors, including, but not limited to, the type and structure of side group, steric factors, the desired level for an intended end-use, and the functionalization route and conditions. The generally accepted maximum degree of functionalization of a single-wall carbon nanotube is one functional group per two single-wall nanotube carbons.

The carbon nanotube that is to be sidewall functionalized can be pristine, i.e. without prior derivatization or functionalization, or it can be already sidewall functionalized, such as sidewall fluorinated single-wall carbon nanotubes. The rate of SWNT sidewall functionalization is faster, in the case of the undecyl groups, when fluorinated (F-SWNT) is used compared to unfluorinated SWNT. When F-SWNT is sidewall functionalized with an organic group, some of the fluorine atoms may remain bonded to the nanotube, such that the resulting nanotube has both fluorine and organic substituents bonded to the sidewall.

Sidewall Functionalization Utilizing Aroyl Peroxides

In another embodiment, aryl-containing groups are bonded to the sidewall of carbon nanotubes. Aryl free radicals are generated by aromatic acyl peroxides, also called aroyl peroxides, wherein at least one R or R' organic group contains an aromatic moiety. In one embodiment, phenyl groups are bonded to the sidewall of single-wall carbon nanotubes using phenyl radicals generated by decomposition of the aroyl peroxide benzoyl peroxide ($C_6H_5$—C(O)OO(O)C—$C_6H_5$). The chemical reaction scheme is diagrammed in FIG. 1, wherein benzoyl peroxide 1 is used to functionalize the sidewall of a single-wall carbon nanotube (SWNT) and form sidewall-phenylated-SWNT 2. Multiple phenyl groups can be attached to the sidewall of the nanotube. For example, in one embodiment, the degree of functionalization of phenylated single-wall carbon nanotubes was about one phenyl group per about 14 carbons of the single-wall carbon nanotube.

Other aroyl peroxides include, but are not limited to, cinnamoyl peroxide, bis(p-methoxybenzoyl) peroxide, p-monomethoxybenzoyl peroxide, bis(o-phenoxybenzoyl) peroxide, acetyl benzoyl peroxide, t-butyl peroxybenzoate, diisopropyl peroxydicarbonate, cyclohexyl peroxydicarbonate, benzoyl phenylacetyl peroxide, and butylperoxyisopropyl carbonate. The aroyl peroxide can also include heteroatoms, such as in p-nitrobenzoyl peroxide, p-bromobenzoyl, p-chlorobenzoyl peroxide, and bis(2,4-dichlorobenzoyl) peroxide. The aroyl peroxide can also have other substituents on one or more aromatic rings, such as in p-methylbenzoyl peroxide, p-methoxybenzoyl peroxide, o-vinylbenzoyl benzoyl peroxide, and exo- and endo-norbornene-5-carbonyl peroxide. The aromatic ring substitutions of the various groups and heteroatoms can also be in other positions on the ring, such as the ortho, meta or para positions. The aroyl peroxide can also be an asymmetric peroxide and include another organic group that can be an alkyl cyclic, aromatic, or combination thereof.

Figure 2:
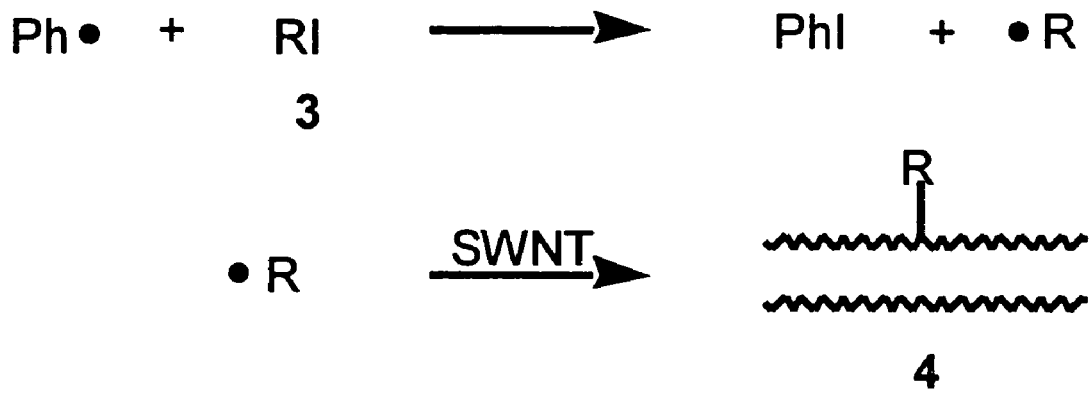
FIG. 2 shows a reaction scheme of one embodiment of the present invention wherein a phenyl radical, such as from benzoyl peroxide 1 reacts with RI 3, where examples of R are given in the list of 4a though 4j, to form an .R carbon-centered free radical, which attaches to the SWNT sidewall to form sidewall-derivatized R-SWNT 4.

In another embodiment, organic iodides, herein denoted RI, can be used as a source of the R organic group for sidewall functionalization of the wall of the carbon nanotubes. The R group can be an alkyl group, aryl group, cyclic group, or combination thereof. The R group can contain functional moieties, such as, but not limited to, carboxylic acid, carboxylates, cyanide groups, nitro groups, esters, ethers, ketones, amides, heteroatoms, such as nitrogen, oxygen, halogens, and combinations thereof. Generally, the number of carbons in the organic iodide is in the range of 1 to about 30. The R-I bond is a carbon-iodine bond, such that the free radical generated from RI is a carbon-centered free radical. In this embodiment, RI is mixed with a peroxide, such as benzoyl peroxide. After the benzoyl peroxide decomposes to phenyl radicals, a free radical displacement of iodide by the phenyl radical generates an R carbon-centered free radical, which then bonds covalently to the carbon nanotube sidewall. In embodiments wherein the carbon nanotubes are single-wall carbon nanotubes, the result is a sidewall R-derivatized SWNT. FIG. 2 shows a reaction scheme wherein a phenyl radical (such as from benzoyl peroxide) undergoes a radical displacement of iodide from RI 3 to generate an .R carbon-centered free radical and wherein the .R free radical bonds to the SWNT sidewall and forms sidewall derivatized SWNT 4. Various organic R groups are shown in FIG. 2 as 4a through 4j. "THP" in 4g means "tetrahydropyran".

Solid State and Liquid State Preparation Procedures

In another embodiment of the present invention, the proportion of single-wall carbon nanotubes used is approximately one to two times that of the acyl peroxide on a weight basis. For solid state reactions, a mechanically-ground mixture of reactants is used in a sealed reactor, such as a stainless steel reactor. The temperature of the reactor is heated above the decomposition temperature of the peroxide, such as a temperature of about 200° C. for a time sufficient to carry out the reaction to the desired state of completion. The reaction time will vary depending on the acyl peroxide used. A typical reaction time can be about 12 hours. Solid state reactions can be done with solid peroxides and carbon nanotubes. The method is convenient and no solvent dispersion or solvent removal is required.

For solution phase reactions, the single-wall carbon nanotubes are dispersed in a suitable solvent, such as, for example, benzene, o-dichlorobenzene, or nitrobenzene.

Dispersing the nanotubes in solvent can be facilitated by sonication or ultrasonication. The time required to disperse the nanotubes is dependent on the solvent and the amount and type of nanotubes being dispersed. Generally, the nanotubes can be dispersed in about 30 minutes to about 2 hours, although longer mixing times may be required, depending on the dispersing apparatus, among other factors. After dispersing the nanotubes in solvent, the acyl peroxide is added and the mixture is refluxed under an environment of nitrogen or an inert gas, such as argon. The solvent is also selected such that the refluxing is done above the decomposition temperature of the selected peroxide. For example, when using o-dichlorobenzene as a solvent and either benzoyl peroxide or lauroyl peroxide, the reflux conditions are in a temperature range of about 80° C. to about 100° C. for a time in a range of about 3 hours to about 120 hours effective for the decomposition of the acyl peroxide to form carbon-centered radicals. For example, in one embodiment, purified single-wall carbon nanotubes are sonicated for 30 minutes to suspend the nanotubes in benzene. The suspension is then heated in the presence of benzoyl peroxide to 75° C. and held at temperature for 24 hrs under an argon atmosphere to bond phenyl groups to the single-wall carbon nanotube sidewalls.

After the sidewall functionalization reaction is complete, the sidewall functionalized single-wall carbon nanotubes can be isolated from unreacted peroxides and by-products by washing with solvent. For example, sidewall-functionalized SWNT can be filtered from the unreacted products and by-products, and washed with a solvent, such as chloroform. The nanotubes can then be dried, such as in a vacuum oven at about 100° C. overnight.

Preparation of SWNT Sidewall Functionalized with Alkyl Radicals from Organic Iodides In another embodiment, the acyl peroxide, benzoyl peroxide, is used with R-iodide (RI) to attach organic R groups other than phenyl to the carbon nanotube sidewall. In this embodiment, benzoyl peroxide is decomposed to carbon dioxide and phenyl radicals. The phenyl radicals react with the R-iodide via an iodide displacement to form .R radicals. The .R radicals bond to the nanotubes to form carbon nanotubes with R groups bonded to the sidewall of the nanotubes. The chemical reaction scheme for this method of preparing sidewall functionalized SWNT is shown in FIG. 2, wherein 3 is RI and 4 represents sidewall functionalized R-SWNT. Examples of R groups are also shown in FIG. 2 as 4a through 4j. The groups represented are n-octadecyl 4a, n-propyl 4b, sec-butyl 4c, ethyl amide 4d, n-propyl chloride 4e, acetonitrile 4f, and n-propyl tetrahydropyran ether 4g, ethyl acetate 4h, poly(ethylene glycol)-n-butyl ether 4i, and neopentyl 4j. Examples of other R groups that may be attached to the sidewall of single-wall carbon nanotubes in this manner, include, but are not limited to linear, cyclic and branched alkyl groups, (an example of a branched alkyl group is a neopentyl group), polymeric groups, such as polyethylene glycol, polyolefins, polyesters, polyurethanes, functionalized polymer groups, such as polyethylene glycol n-butyl ether groups, functional groups such as ethers, alcohols, carboxylic acid groups, carboxylates, aromatic groups, aromatic groups substituted with functional groups, and/or heteroatoms, such as halides, nitro groups, amino groups, and combinations thereof.

Preparation of SWNT Sidewall Functionalized with Methyl Groups

Figure 3:
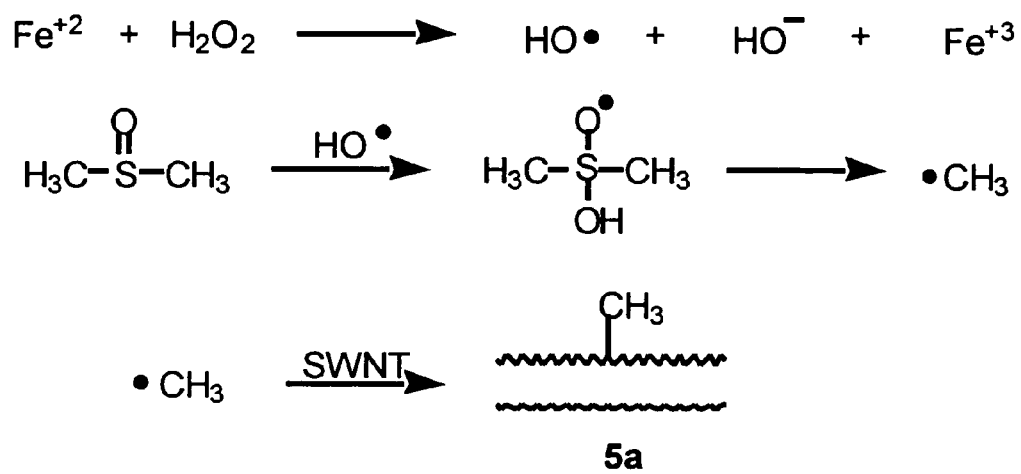

Methyl radicals can be generated from dimethyl sulfoxide by the method of Minisci (see Fontana, F; Minisci, F.; and Vismara, E. *Tetrahedron Lett.* 1988, 29, 1975-1978, "Minisci", incorporated herein by reference) by reaction with hydroxyl radicals. A convenient source of hydroxyl radicals can be generated using Fenton's reagent, which includes hydrogen peroxide and a divalent iron catalyst. The methyl radicals generated from the dimethyl sulfoxide and hydroxyl radicals can bond to the carbon nanotube wall to form sidewall methylated carbon nanotubes. One embodiment for methylating the sidewall of single-wall carbon nanotubes is diagrammed in FIG. 3. As shown in FIG. 3, hydrogen peroxide, in the presence of $Fe^{+2}$, forms a hydroxyl free radical. The radical is further reacted with a dimethyl sulfoxide to form a methyl radical. The methyl radical attaches to the SWNT sidewall to form a sidewall-methylated-SWNT 5a. Although the methyl radicals effectively bond to the sidewall of the SWNT, the resulting methylated SWNT has less solubility in most organic solvents than SWNT alkylated with groups comprising more carbon atoms or larger functional groups.

Figure 4:
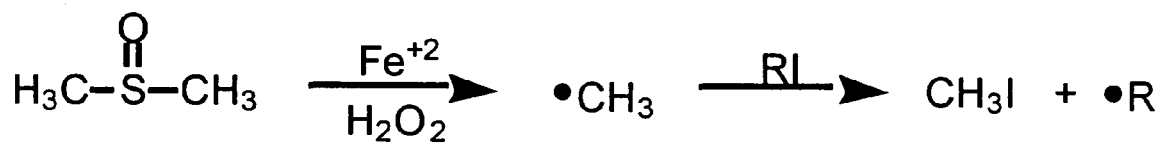
FIG. 4 shows a reaction scheme of one embodiment of the present invention wherein dimethyl sulfoxide in the presence of $Fe^{+2}$ and hydrogen peroxide generates a methyl radical. The methyl radical in the presence of an iodo-R compound RI generates iodomethane and an .R carbon-centered free radical.

Preparation of Methyl Radicals Using the Minisci Route and the Formation of Other Organic Radicals Using Radical Displacement of Iodine Because the methyl radical is the least stable alkyl radical, it can be used to selectively generate other alkyl radicals. The methyl radicals generated using the Minisci method can also be used to generate other alkyl radicals using organic iodides (RI) as the source of other alkyl or aryl groups. This process, diagrammed in FIG. 4, offers another route to other free radicals and another embodiment for adding functional groups to the carbon nanotube sidewall. FIG. 4 shows a reaction scheme wherein dimethyl sulfoxide, in the presence of $Fe^{+2}$ and hydrogen peroxide, generates a methyl radical. The methyl radical in the presence of an iodo-R compound RI generates iodomethane and an .R carbon-centered free radical. Examples of R groups in RI include, but are not limited to, those previously listed herein.

Figure 5:
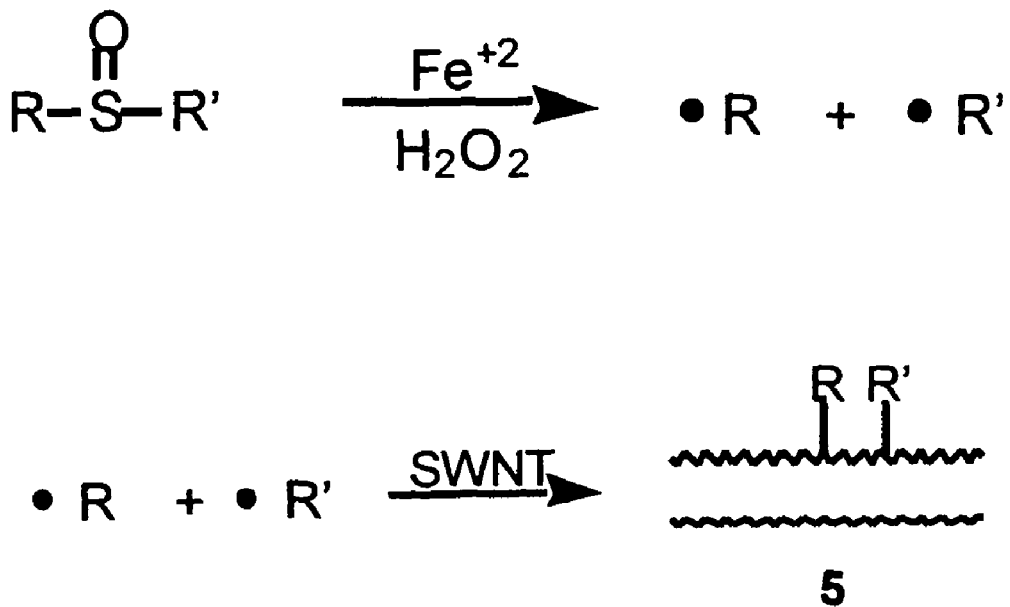
FIG. 5 shows a reaction scheme of one embodiment of the present invention wherein an organic sulfoxide (R—S(O)—R') in the presence of $Fe^{+2}$ and hydrogen peroxide generates .R and .R' radicals, which further react with SWNT to form R- and R'-sidewall functionalized SWNT.

Preparation of SWNT Sidewall Functionalized with Various Organic R Groups Using the Minisci Method of Generating Free Radicals Alkyl and aryl radicals can be generated using the Minisci method using sulfoxides with various alkyl and/or aryl groups. In this embodiment, other alkyl groups can be attached to the SWNT sidewall without the iodide replacement reaction. In this embodiment, sulfoxides, which have the form R—S(O)—R', where —R and —R' can be the same or different, can also be used to generate various carbon radicals without the use organic iodides. The R groups can be alkyl or aromatic or a combination thereof. This process, diagrammed in FIG. 5, offers another route to other free radicals and another embodiment for adding functional groups to the carbon nanotube sidewall. FIG. 5 shows a reaction scheme wherein an organic sulfoxide (R—S(O)—R'), in the presence of $Fe^{+2}$ and hydrogen peroxide, generates .R and .R' radicals, which further react with SWNT to form R- and R'-sidewall functionalized SWNT. Examples of R groups shown in FIG. 5 include methyl groups 5a, n-propyl groups 5b, isopropyl groups 5c, n-butyl groups 5d, sec-butyl groups 5e, and phenyl groups 5f. The R or R' group generally can comprise a number of carbons in the range of 1 and about 30.

Figure 6:
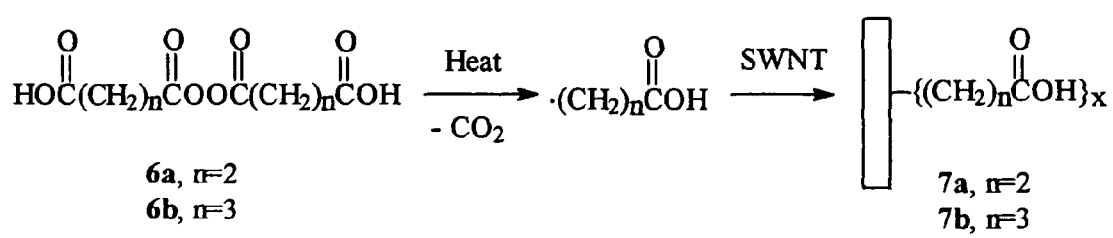
FIG. 6 shows a reaction scheme of one embodiment of the present invention wherein a dicarboxylic acid acyl peroxide such as 6a or 6b, in the presence of heat, liberates $CO_2$ and generates a carbon-centered free radical which bonds to the sidewall of a single-wall carbon nanotube to form sidewall derivatized SWNT with organic groups having terminal carboxylic acid groups, such as 7a or 7b.

Preparation of SWNT Sidewall Functionalized Organic Moieties with Terminal Carboxylic Acid Groups In another embodiment, alkyl groups terminated with the carboxylic acid functionality are attached to the sidewalls of the single-wall carbon nanotubes. FIG. 6 shows an embodiment wherein a dicarboxylic acid acyl peroxide such as 6a or 6b, in the presence of heat, liberates $CO_2$ and generates a carbon-centered free radical which bonds to the sidewall of a single-wall carbon nanotube to form sidewall derivatized SWNT with organic groups having terminal carboxylic acid groups, such as 7a or 7b. In one embodiment diagrammed in FIG. 6, organic acyl peroxides of dicarboxylic acids, such as $HO(O)C(CH_2)_nC(O)OO(O)C(CH_2)_nC(O)OH$ (where 6a, n=2, is succinic acid peroxide; and 6b, n=3, is glutaric acid peroxide) are used to functionalize the sidewall of single-wall carbon nanotubes with functional groups of the form $HO(O)C(CH_2)_n$—, where the sidewall functionalized SWNT for n=2 using 6a is represented by 7a and for n=3 using 6b is represented by 7b. In another embodiment, phthalic acid peroxide is decomposed to an organic radical, wherein the radical bonds with wall of the carbon nanotube and the resulting organic sidegroup has a terminal carboxylic acid group.

Acyl peroxides have the form, RC(O)OO(O)CR, where R can be aliphatic, aromatic or another group, and readily decompose to release carbon dioxide and form free radicals R upon mild heating. Succinic acid peroxide, 6a, decomposes to form 3-carboxyl-propionyl-oxyl radicals, which can subsequently release $CO_2$ to yield another radical, 2-carboxyl-ethyl. Glutaric acid peroxide, 6b, yields a 3-carboxyl-propyl radical via a similar route. These carboxyl-alkyl radicals, generated in situ from corresponding peroxides 6a and 6b, react with single-wall carbon nanotubes to produce sidewall acid-functionalized SWNT-derivatives 7a and 7b, as diagrammed in FIG. 6. The subscript "x" in the functionalized SWNT derivatives indicates the attachment of a variable number of sidewall groups to the nanotube.

Figure 7:
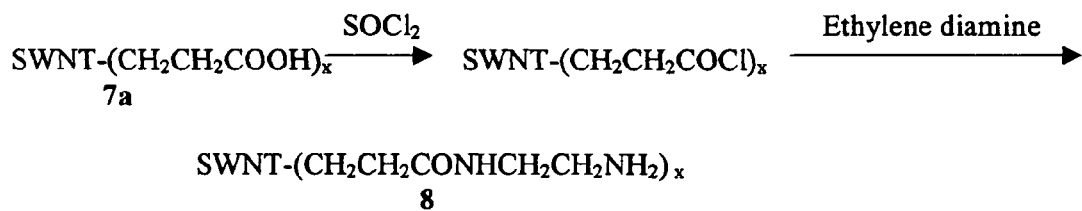
FIG. 7 shows a reaction scheme of one embodiment of the present invention wherein a single-wall carbon nanotube side-wall functionalized with alkyl having a terminal carboxylic acid group 7a is reacted with thionyl chloride to form an alkyl acyl chloride sidewall-functionalized SWNT which is further reacted with ethylene diamine to form a sidewall alkyl amide functionalized SWNT 8, wherein the sidewall organic group has a terminal amine.

Reactions of Carboxylic Acid Sidewall Functionalized SWNT with Amines and Diamines Single-wall carbon nanotubes with sidewall alkyl groups having terminal carboxylic acid functionality, such as 7a and 7b, shown in FIG. 6, can further be reacted to yield nanotubes with other reactive functionality. For example, amide derivatives can be made by reacting the carboxylic acid functionality with a chlorinating agent, such as thionyl chloride, and subsequently with an amine compound. Other possible chlorinating agents, include, but are not limited to phosphorous trichloride, phosphorous pentachloride, and oxalyl chloride ($C_2O_2Cl_2$). To give the SWNT side group a terminal amine, a diamine can be used. Examples of suitable diamines are ethylene diamine, 4,4'methylenebis(cyclohexylamine), propylene diamine, butylene diamine, hexamethylene diamine and combinations thereof A reaction scheme of one embodiment of the present invention using the diamine, ethylene diamine is shown in FIG. 7. FIG. 7 shows a reaction scheme wherein a single-wall carbon nanotube sidewall functionalized with an alkyl having a terminal carboxylic acid group 7a is reacted with thionyl chloride to form an alkyl acyl chloride sidewall-functionalized SWNT which is further reacted with ethylene diamine to form a sidewall alkyl amide functionalized SWNT 8, wherein the sidewall organic group has a terminal amine. The subscript "x" in 8 indicates a variable number of sidegroups on the nanotube.

Figure 8:
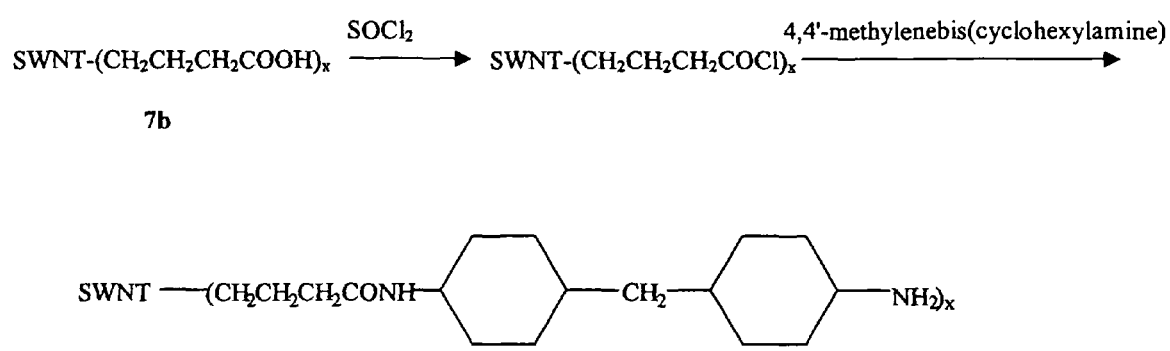
FIG. 8 shows a reaction scheme of one embodiment of the present invention wherein a single-wall carbon nanotube sidewall functionalized with an alkyl having a terminal carboxylic acid group 7b is reacted with thionyl chloride to form an alkyl acyl chloride sidewall-functionalized SWNT which is further reacted with 4,4'-methylenebis(cyclohexylamine) to form a side-wall alkyl amide functionalized SWNT 9, wherein the sidewall organic group has a terminal amine. The subscript "x" indicates a variable number of sidegroup attachments.

In another embodiment, diagrammed in FIG. 8, a diamine having a cyclic ring, 4,4'-methylenebis(cyclohexylamine), is used to give a terminal amine functionality to group on the SWNT sidewall. FIG. 8 shows a reaction scheme wherein a single-wall carbon nanotube sidewall functionalized with an alkyl having a terminal carboxylic acid group 7b is reacted with thionyl chloride to form an alkyl acyl chloride side-wall functionalized SWNT which is further reacted with 4,4'-methylenebis(cyclohexylamine) to form a sidewall alkyl amide functionalized SWNT 9, wherein the sidewall organic group has a terminal amine. The subscript "x" in 9 indicates a variable number of sidegroups on the nanotube.

Figure 9:
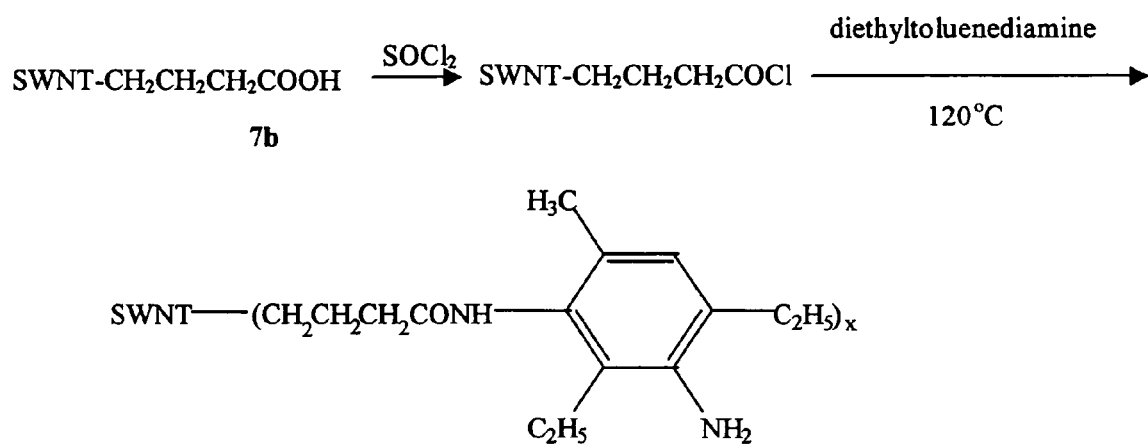
FIG. 9 shows a reaction scheme of one embodiment of the present invention wherein a single-wall carbon nanotube side-wall functionalized with an alkyl having a terminal carboxylic acid group 7b is reacted with thionyl chloride to form a terminal acyl chloride sidewall-functionalized SWNT which is further reacted with diethyltoluenediamine to form an aryl side-wall functionalized SWNT 10, wherein the aryl sidewall function has an amide linkage and a terminal amine. The subscript "x" indicates a variable number of sidegroup attachments.

In another embodiment, an aryl diamine, diethyltoluenediamine, is used in the reaction scheme diagrammed in FIG. 9. FIG. 9 shows a reaction scheme wherein a single-wall carbon nanotube sidewall functionalized with an alkyl having a terminal carboxylic acid group 7b is reacted with thionyl chloride to form a terminal acyl chloride sidewall-functionalized SWNT which is further reacted with diethyltoluenediamine to form an aryl sidewall functionalized SWNT 10, wherein the aryl sidewall function an amide linkage and a terminal amine. The subscript "x" in 10 indicates a variable number of sidegroups on the nanotube.

The method of this invention is also generally applicable to multi-wall carbon nanotubes. In the case of multi-wall carbon nanotubes, the outer sidewall can be functionalized in the same manner as that of the single wall of a single-wall carbon nanotube.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

This example describes the procurement, preparation and purification of the single-wall carbon nanotubes. HIPCO® single-wall carbon nanotubes, having an average diameter of about 1 nm, were obtained from Rice University (HIPCO is a trademark registered to Carbon Nanotechnologies, Inc., Houston, Tex.) To remove iron, used as a catalyst, the nanotubes were purified using a gaseous wet air oxidation followed by an aqueous hydrochloric acid rinse according to the procedures of Chiang, I. et al. *J. Phys. Chem. B,* 2001, 105, 8297-8301 ("Chiang"). Following the purification, the nanotubes were annealed at 800° C. for 2 hours in argon.

Example 2

This example demonstrates a procedure for functionalizing the sidewalls of single-wall carbon nanotubes using the acyl peroxide, benzoyl peroxide.

Purified SWNT (50 mg) was sonicated in benzene (65 ml) for 2 hours to form a SWNT suspension. 6.7 g benzoyl peroxide, which decomposes under mild conditions (75-80° C.) to form carbon dioxide and phenyl radicals, as shown in FIG. 1, was added to the SWNT suspension. The heterogeneous mixture was stirred under argon at 70-80° C. overnight to decompose the benzoyl peroxide and form sidewall-phenylated-SWNT (Ph-SWNT). During the heating, the benzoyl peroxide decomposed to phenyl radicals and carbon dioxide, and the phenyl radicals attached to the sidewalls of the SWNT to form sidewall-derivatized phenyl-SWNT (Ph-SWNT). 50 ml ethanol was then added to precipitate the dissolved Ph-SWNT. The mixture was then filtered through a 0.2 μm PTFE (polytetrafluoroethylene) filter and washed with ethanol. The nanotubes that were collected from the filter were washed by suspending the nanotubes in 100 ml ethanol, sonicating the mixture for 30 min and filtering again. The ethanol-washing procedure was repeated twice, except that hot ethanol was used in the last washing. The ethanol-washed Ph-SWNT was dried under vacuum for 4 hours at 70° C.

The degree of phenyl-group functionalization was estimated by TGA (thermal gravimetric analysis) to be about one phenyl group for about 14 carbon atoms in the nanotube framework. (See FIG. 1 which gives a diagram of the chemical reaction. See also Example 3 in Table 1 below.) Increasing the peroxide concentration did not substantially increase the degree of phenyl functionalization, suggesting that steric effects may be a limiting factor in the degree of phenyl-group functionalization.

The phenyl-functionalization caused the nanotubes to exhibit remarkably improved solubility and/or dispersability in $CHCl_3$, $CH_2Cl_2$, DMSO (dimethylsulfoxide), DMF (dimethylformamide) and 1,2-dichlorobenzene solvents. Although the solubility of the phenylated nanotubes also was higher than pristine nanotubes in benzene, toluene and THF (tetrahydrofuran), the increase in solubility was not as pronounced in $CHCl_3$, $CH_2Cl_2$, DMSO, DMF and 1,2-dichlorobenzene. The phenylated nanotubes were insoluble in n-hexane and ether.

Example 3

This example demonstrates a general method for functionalizing the sidewalls of single-wall carbon nanotubes with R groups other than phenyl groups using benzoyl peroxide as an initial source of free radicals that react with R-iodides. To attach R groups other than phenyl to the SWNT sidewall, R-iodide, (RI) (2.5 equivalents per mole of benzoyl peroxide) was used with benzoyl peroxide. The R groups used in this example are given in Table 1, shown below. The corresponding R-iodide compounds were obtained from Aldrich, except for the iodo derivative of poly(ethylene glycol)-n-butyl ether (See 4i in Table 1), which was prepared as follows according to procedures adapted from S. Arndt, et al., *Chem. Eur. J.* 2001, 7, 993-1005. To a solution of imidazole (3.3843 g, 49.71 mmol) and $PPh_3$ (5.214 g, 19.88 mmol) in 110 ml $CH_2Cl_2$ at 0° C., iodine (5.467 g, 21.54 mmol) was added. The solution was stirred for 5 min, and poly(ethylene glycol)-n-butyl ether $HO(CH_2CH_2)_m-CH_2CH_2CH_2CH_3$ (3.4135 g, 16.57 mmol, average MW about 206, m≈3) dissolved in 20 ml $CH_2Cl_2$, was then added slowly. The mixture was stirred for 4 hrs with exclusion of light. The reaction was then quenched by adding 20 ml saturated aqueous solution of sodium sulfite $Na_2SO_3$. The aqueous layer was extracted with ethyl ether and the extract dried over $MgSO_4$. The solvents were removed by rotary evaporator. The crude iodo derivative of poly(ethylene glycol)-n-butyl ether was purified by column chromatography (3.403 g, 10.77 mmol yield 65%).

The reaction scheme for the preparation of sidewall functionalized R-SWNT is shown in FIG. 2. The benzoyl peroxide is decomposed to phenyl radicals, which, in turn, react with the R-iodide to form organic .R free radicals, which, in turn, bond to the sidewall of the single-wall carbon nanotube. The general procedures, which follow, were used with different RI compounds.

20 mg purified single-wall carbon nanotubes (1.6 mmols carbon) were suspended in 30 ml benzene and sonicated for 30 min. in a bath sonicator (Cole Parmer) to form a SWNT-benzene suspension. R-iodide (4.0 mmol) and 403 mg benzoyl peroxide (1.6 mmol) were added to the SWNT-benzene suspension. The resulting mixture was heated under argon at 75° C. for 24 hours with stirring. After the heating, the mixture was diluted with 100 ml benzene and filtered through a 0.2 μm PTFE (polytetrafluoroethylene) membrane. The sidewall-functionalized R-SWNT was caught on the filter and washed with copious amounts of benzene. The washing procedure (filtering and washing) was repeated twice with benzene and once each with acetone and methanol. The washed R-SWNT was finally removed from the filter and dried under vacuum at 80° C. for 12 hours. Even though benzoyl peroxide was used as the initial radical source, no evidence of phenyl groups was evident on the various sidewall-functionalized R-SWNT. The R groups shown are shown in Table 1, along with the TGA (thermogravimetric analysis) of the sidewall R-functionalized SWNT. TGA was used to determine the weight loss due to the evolution of the particular R group and the associated estimate of the ratio of carbons associated with SWNT to the number of R groups bonded to the SWNT sidewalls. The TGA/MS (thermogravimetric analysis/mass spectroscopy) for sidewall phenylated SWNT indicate the phenyl groups detach at about 400° C.

TABLE 1

Weight loss and estimated SWNT carbon/alkyl group ratio from TGA with heating to 800° C. in argon.

| Example Number | Figure Number | R group on SWNT sidewall | Weight loss (wt %)[a] Observed by TGA | Ratio of SWNT carbons to each R group |
|---|---|---|---|---|
| | None | SWNT-pristine | 3.6 | NA |
| 3 | 2 | -Phenyl | 31 | 14 |
| 4 | 4a | —$(CH_2)_{17}CH_3$ | 40 | 31 |
| 4 | 4b | —$(CH_2)_3CH_3$ | 42 | 6 |
| 4 | 4c | —$CH(CH_3)CH_2CH_3$ | 46 | 5 |
| 4 | 4d | —$CH_2CONH_2$ | 48 | 5 |
| 4 | 4e | —$(CH_2)_3Cl$ | 44 | 8 |
| 4 | 4f | —$CH_2CN$ | 30 | 8 |
| 4 | 4g | —$(CH_2)_3$—O—$THP^b$ | 41 | 17 |
| 4 | 4h | —$CH_2COOCH_2CH_3$ | 35 | 13 |
| 4 | 4i | —$(CH_2CH_2O)_m(CH_2)_3CH_3$ where m~3 | 26 | 45 |

[a]All values were compensated for weight loss of about 2-3% due to degassing at low temperature.
[b]THP denotes "tetrahydropyran."

Example 4

This example demonstrates further reactions of SWNT having sidewall-functional groups. SWNT sidewall-derivatized with ethyl acetate (See 4h in Table 1) was made according to procedures given in Example 3. 38.6 mg SWNT-sidewall derivatized with ethyl acetate was sonicated in 50 ml 2M NaOH for 30 min. Alkaline hydrolysis was conducted at 100° C. for 24 hours, followed by acidification with 2 M HCl at 100° C. for 24 hours to convert the ethyl ester group to an acetic acid group. To further functionalize the nanotubes to an amide by reaction with an amine, the nanotubes sidewall derivatized with acetic acid groups were dried under vacuum and then sonicated in 1 ml of anhydrous DMF to form a dispersion in DMF. The dispersion was immediately added to 10 ml thionyl chloride ($SOCl_2$) and heated at 70° C. for 24 hours to convert the terminal carboxylic acid group to a terminal acyl chloride. The single-wall nanotubes with sidewall-functionality having terminal acyl chloride were filtered onto a 0.2 μm PTFE (polytetrafluoroethylene) membrane filter and rinsed with anhydrous THF (tetrahydrofuran) to remove excess $SOCl_2$. The resulting rinsed single-wall carbon nanotubes having sidewall groups terminated with an acyl chloride were mixed with 1 g of octadecylamine (ODA or $CH_3(CH_2)_{17}NH_2$) (melting point, 50-52° C.) and heated at 90 to 100° C. for 96 hours. The reaction of the acyl chloride with the ODA formed a SWNT having an alkyl amide sidegroup.

Figure 10:
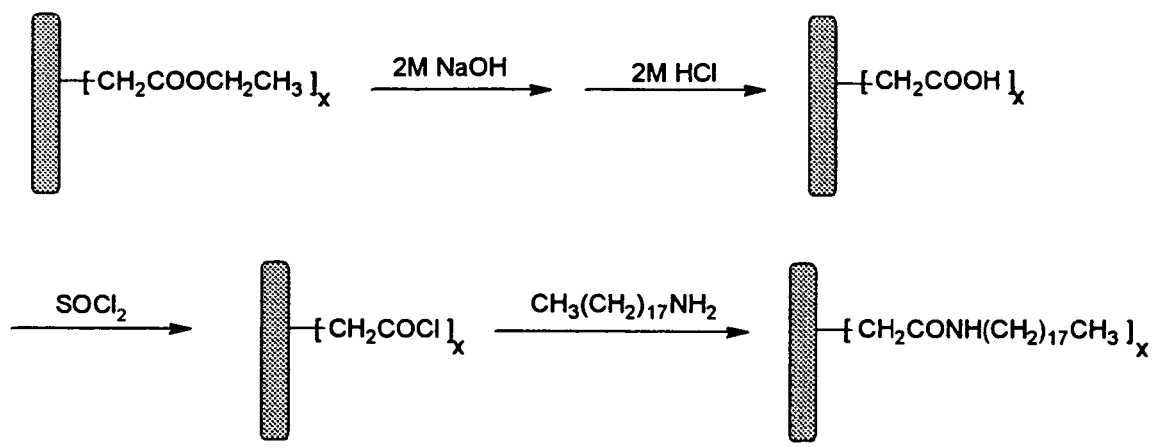
FIG. 10 shows a reaction scheme wherein single-wall carbon nanotubes that have been sidewall functionalized with an ester are saponified with sodium hydroxide and neutralized with hydrochloric acid to form single-wall carbon nanotubes that have alkyl groups with terminal carboxylic acid functionality, which are further chlorinated with thionyl chloride to form an acyl chloride, which is further reacted with octadecyl amine to form an alkyl amide group that is bonded to the single-wall carbon nanotube sidewall, where the subscript "x" indicates a variable number of sidegroup attachments.

The reaction scheme for the preparation of SWNT with a sidewall-functionalized amide from the SWNT having a sidewall-functionalized alkyl ester is shown in FIG. 10. FIG. 10 shows a reaction scheme wherein single-wall carbon nanotubes that have been sidewall functionalized with an ester are saponified with sodium hydroxide and neutralized with hydrochloric acid to form single-wall carbon nanotubes that have alkyl groups with terminal carboxylic acid functionality, which are further chlorinated with thionyl chloride to form an acyl chloride, which is further reacted with octadecyl amine to form an alkyl amide group that is bonded to the single-wall carbon nanotube sidewall. The subscript "x" indicates a variable number of sidegroups on the nanotube. After the heating, the reaction mixture was cooled to room temperature and excess ODA was removed by collecting the sidewall-functionalized nanotubes on a filter and washing with copious amounts of ethanol and chloroform. The single-wall carbon nanotubes sidewall-functionalized with the alkyl amine were dried in the form of a thick paper at 80° C. under vacuum for 12 hours. TGA weight loss was 39.82%, indicative of a SWNT carbon-to alkyl amide group ratio of about 39-to-1.

Example 5

This example demonstrates the sidewall functionalization of single-wall carbon nanotubes with carbon centered radicals using the Minisci method of making the carbon centered radicals. In the Minisci method, an organic sulfoxide of the form R—S(O)—R', where R, R' can be an alkyl or aromatic group, reacts with a hydroxyl radical to generate .R and .R' radicals. Hydroxyl radicals can be generated in various ways, however, Fenton's reagent, a convenient means, generates hydroxyl radicals from hydrogen peroxide using a divalent iron catalyst. The .R and .R' radicals covalently bond to the sidewalls of the carbon nanotubes. For example, methyl radicals can be generated from dimethyl sulfoxide via the Minisci route and covalently bonded to the SWNT sidewall. The reaction scheme is shown in FIG. 3.

Preparation of Sidewall-Alkylated-SWNT Using Alkyl Radicals Generated by the Minisci Route Single-wall carbon nanotubes were functionalized with alkyl groups using various alkyl sulfoxides and the procedure that follows. The alkyl sulfoxides used with this procedure include a) dimethyl sulfoxide, b) di-n-propyl sulfoxide, c) di-iso-propyl sulfoxide, d) di-n-butyl sulfoxide and e) di-sec-butyl sulfoxide. Dimethyl sulfoxide, di-n-propyl sulfoxide and di-n-butyl sulfoxide were obtained commercially from Aldrich. Di-iso-propyl sulfoxide and di-sec-butyl sulfoxide were synthesized by oxidizing the corresponding di-alkyl-sulfides with sodium metaperiodate (NaIO$_4$) according to the following reaction scheme:

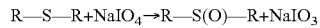

R—S—R+NaIO$_4$→R—S(O)—R+NaIO$_3$ 16 mg purified SWNT (1.3 mmol carbon) was sonicated for 30 min in 20 ml alkyl sulfoxide to form a SWNT/alkyl sulfoxide suspension. To this suspension was added 2.891 g (10.4 mmol) FeSO$_4$.7H$_2$O, followed by dropwise addition of H$_2$O$_2$ (30%, 20.8 mmol) over a period of 30 min under argon at room temperature. The mixture was stirred for 2 hours, diluted with water, filtered over a PTFE (0.2 µm) membrane, and washed extensively with H$_2$O. The sidewall-alkyl functionalized nanotubes collected in the filter were then washed by suspending the nanotubes in water, sonicating for 20 min, and refiltering. This washing procedure was repeated once with water and twice with ethanol. The washed sidewall-alkyl-derivatized nanotubes collected in the filter were dried under vacuum at 80° C. for 12 hours and looked like a black thin mat of nanotubes resembling a buckypaper. The resulting sidewall-derivatized SWNT were subjected to TGA analysis to determine the weight loss due to the evolution of the particular R group and to estimate of the ratio of carbons associated with SWNT to the number of R groups bonded to the SWNT sidewall. The results are tabulated in Table 2 below.

Preparation of Sidewall-Phenylated-SWNT Using Diphenyl Sulfoxide by Minisci Route 16 mg purified SWNT (1.3 mmol of carbon) was sonicated in 50 ml of 1% SDS (sodium dodecyl sulfate) about 30 minutes to form an aqueous SWNT suspension. The suspension was then filtered to produce a SWNT slurry. To the SWNT slurry was added 9.0 g (44 mmol) diphenyl sulfoxide and sonicated for 30 min to form a SWNT/diphenyl sulfoxide suspension. To this suspension was added 2.891 g (10.4 mmol) FeSO$_4$.7H$_2$O, followed by dropwise addition of H$_2$O$_2$ (30%, 20.8 mmol) over a period of about 30 min under argon at room temperature. The solution was stirred, diluted with water, filtered over a 0.2 µm polytetrafluoroethylene (PTFE) membrane, and washed extensively with H$_2$O and ethanol.

The resulting sidewall-phenylated SWNT was subjected to TGA analysis to determine the weight loss due to the evolution phenyl groups and estimate of the ratio of carbons associated with SWNT to the number of phenyl groups bonded to the SWNT sidewall. The results are given in Table 2 below.

TABLE 2

Weight loss and estimated SWNT carbon/alkyl group ratio from TGA with heating to 800° C. in argon.

| Example Number | Figure Number | R group on SWNT sidewall | Weight loss (%)$^a$ Observed by TGA | Ratio of SWNT carbons to each R group |
|---|---|---|---|---|
| | None | None (pristine SWNT) | 3.6 | NA |
| 5 | 5a | —CH$_3$ | 15 | 7 |
| 5 | 5b | —CH$_2$CH$_2$CH$_3$ | 18 | 16 |
| 5 | 5c | —CH(CH$_3$)$_2$ | 15 | 18 |
| 5 | 5d | —CH$_2$CH$_2$CH$_2$CH$_3$ | 17 | 22 |
| 5 | 5e | —CH(CH$_3$)CH$_2$CH$_3$ | 12 | 32 |
| 5 | 5f | -Phenyl | 13 | 40 |

$^a$All values were compensated for weight loss of about 2-3% due to degassing at low temperature.

Example 6

This example demonstrates the use of acyl peroxides for the preparation of sidewall-derivatized single-wall carbon nanotubes having sidegroups terminated with carboxylic acid and amine terminated groups. The carbon-centered free radicals terminated with carboxylic acid groups were generated from the decomposition of the diacyl peroxides having terminal carboxylic acid groups. Examples of such peroxides include, but are not limited to, succinic acid peroxide and glutaric acid peroxide, derived from succinic anhydride and glutaric anhydride, respectively. The diamines used were ethylene diamine, 4,4'-methylenebis(cyclohexylamine), and diethyltoluenediamine.

HIPCO single-wall carbon nanotubes were obtained, purified and prepared according to Example 1.

Preparation of Succinic (6a) and Glutaric Acid Peroxides (6b)

Succinic acid peroxide (6a) and glutaric acid peroxide (6b) were synthesized using the one-step procedure of Clover, et al. Am. Chem. J. 1904, 32, 43-68. 10 g finely powdered succinic or glutaric anhydride (each obtained from Aldrich) were added to 20 ml ice cold 8% hydrogen peroxide and stirred for 30 minutes until all the powder dissolved and a white gel-like solution formed. The solution was filtered through a 1-µm pore size PTFE (polytetrafluoroethylene) membrane (Cole Palmer). The filtrate was washed with small amount of water and air-dried for 10 minutes. White peroxide product was collected from the membrane, put into a glass vial and vacuum dried for 24 hours at room temperature. Approximately 6.5 g of each peroxide, 6a and 6b, were obtained using this procedure.

The peroxides 6a and 6b were analyzed by ATR-FTIR (Attenuated Total Reflectance-Fourier Transform Infrared Spectroscopy) using a Thermo Nicolet Nexus 870 FTIR system equipped with ATR capability and solid state $^{13}$C NMR (Nuclear Magnetic Resonance) to confirm the syntheses.

ATR-FTIR spectra of both peroxides 6a and 6b showed similar features: a broad band in the 3000-3500 cm$^{-1}$ region due to the carboxylic O—H stretches, peaks of the C—H stretchings in the 2850-3000 cm$^{-1}$ range, absorptions near 1700 cm$^{-1}$ characteristic of the acid carbonyl groups, and pairs of peaks at 1812 and 1779 cm$^{-1}$ assigned to the peroxide carbonyls. CPMAS (Cross Polarized Magic Angle Spinning) spectra of acid peroxides 6a and 6b were obtained with a Bruker (50.3 MHz $^{13}$C, 200.1 MHz $^{1}$H) NMR spectrometer using 5 kHz MAS, a 1-ms contact time, 32.9-ms FID (free induction decay), and 5-s relaxation delay. The solid state $^{13}$C NMR spectra of 6a show three methylene carbon peaks at 29.9, 28.8, and 24.7 ppm and three carbonyl carbon peaks at 181.7, 179.7, and 168.7 ppm., and of 6b-three methylene peaks at 33.0, 28.4, and 19.0 ppm and two carbonyl peaks at 182.2 and 170.3 ppm.

Preparation of Sidewall-Functionalized Succinic Acid-SWNT (7a) and Glutaric Acid-SWNT (7b)

Sidewall-functionalized succinic acid-SWNT (7a) and glutaric acid-SWNT (7b) were prepared by the following procedure. 50 mg purified single-wall carbon nanotubes were placed into a 250-ml flask filled with 50 ml dry o-dichlorobenzene and sonicated (17 W/55 kHz Cole Palmer bath) for 30 minutes to form a SWNT suspension. The SWNT suspension was heated at 80-90° C. for 10 days while adding 0.5 g of peroxide 6a or 6b each day. The carboxyl-alkyl radicals were thermally produced from the dicarboxylic acyl peroxides 6a and 6b (FIG. 6) which have half-lifes on the order of one hour at 90° C. (according to Atofina Chemicals, Inc. as related at website www.atofinachemicals.com). Due to the stabilizing inductive effect of the carboxylic group, the reactivity of the carboxyl-alkyl radicals with SWNT was somewhat reduced compared to undecyl and phenyl radicals. Therefore, a larger excess of peroxide precursor over SWNT (~10:1 weight ratio) was used to promote the addition reaction (FIG. 7) by a concentration effect.

After the reaction was complete, the suspension was cooled and poured into a 500-ml Erlenmeyer flask containing a large amount of tetrahydrofuran and sonicated for 15 minutes to form a solution. After sonication, the solution was filtered using a 0.2 μm pore size PTFE (Cole Palmer) membrane. Functionalized SWNT (7a or 7b) that collected on the membrane was placed into 100 ml of ethanol, sonicated for 20 minutes and the resulting suspension was refiltered. During filtration, ethanol in copious amounts, was used to completely wash unreacted peroxides and reaction byproducts from the functionalized SWNT. After the ethanol washing, the functionalized SWNT 7a or 7b was vacuum dried overnight at 70° C.

Characterization of SWNT Derivatives by Optical Spectroscopy

Raman: Raman spectra of purified and functionalized SWNT were collected with a Renishaw 1000 micro-Raman system using a 780-nm laser source.

Figure 11:
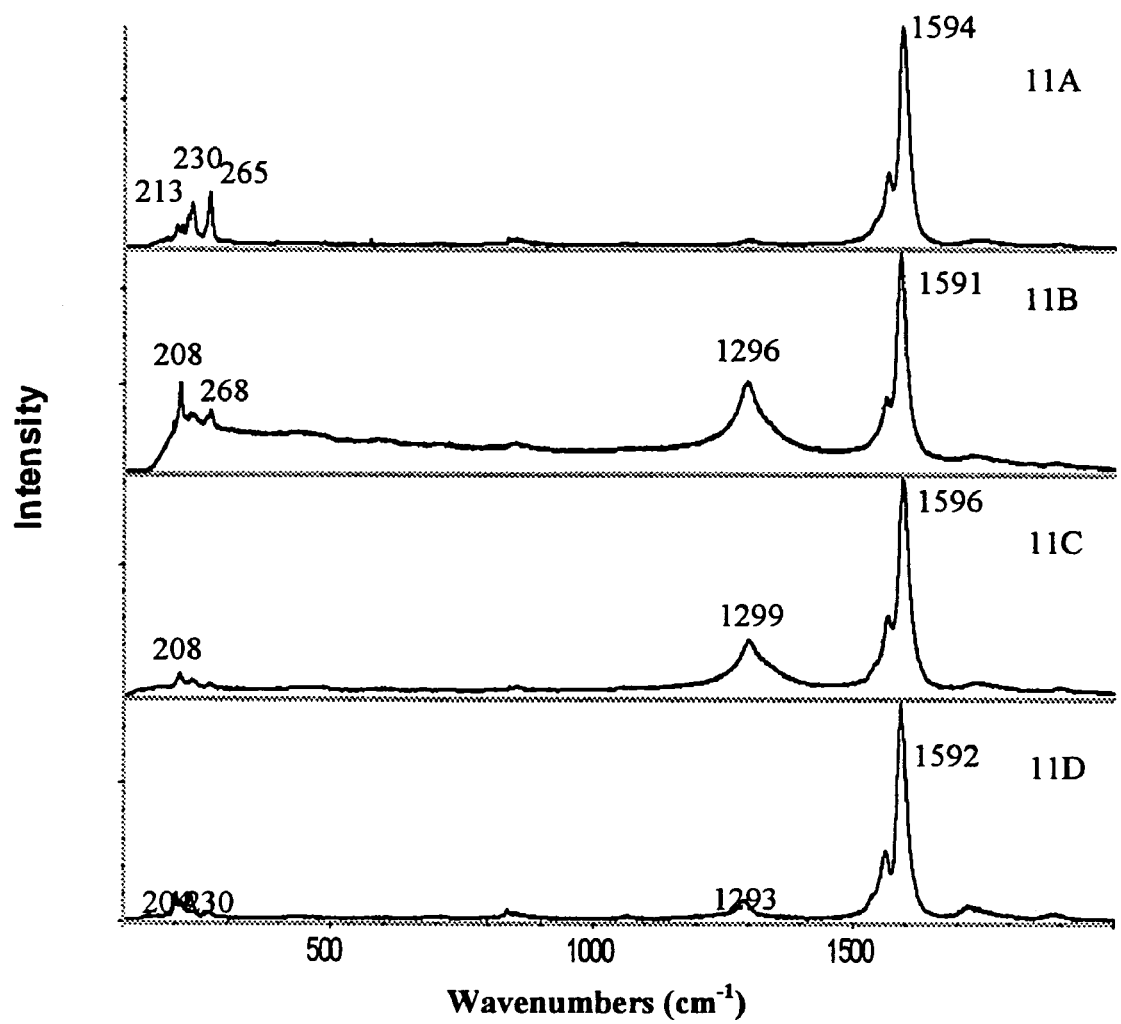
FIG. 11 shows Raman spectra for certain embodiments of the present invention, including spectra for the following pristine and sidewall-derivatized SWNT, wherein the subscript "x" indicates a number of sidegroup attachments which is variable depending on the sidegroup and conditions of preparation.

FIG. 11 shows a Raman spectra for pristine SWNT and certain embodiments of the present invention, wherein the subscript "x" indicates a variable number of sidegroup attachments that is variable depending on the sidegroup and conditions of preparation:
1) pristine SWNT (FIG. 11A);
2) SWNT-(CH$_2$CH$_2$COOH)$_x$ (FIG. 11B);
3) SWNT-(CH$_2$CH$_2$CH$_2$COOH)$_x$ (FIG. 11C); and
4) SWNT-(CH$_2$CH$_2$COOH)$_x$ after heating to 800° C. in argon per TGA (FIG. 11D).

Figure 12:
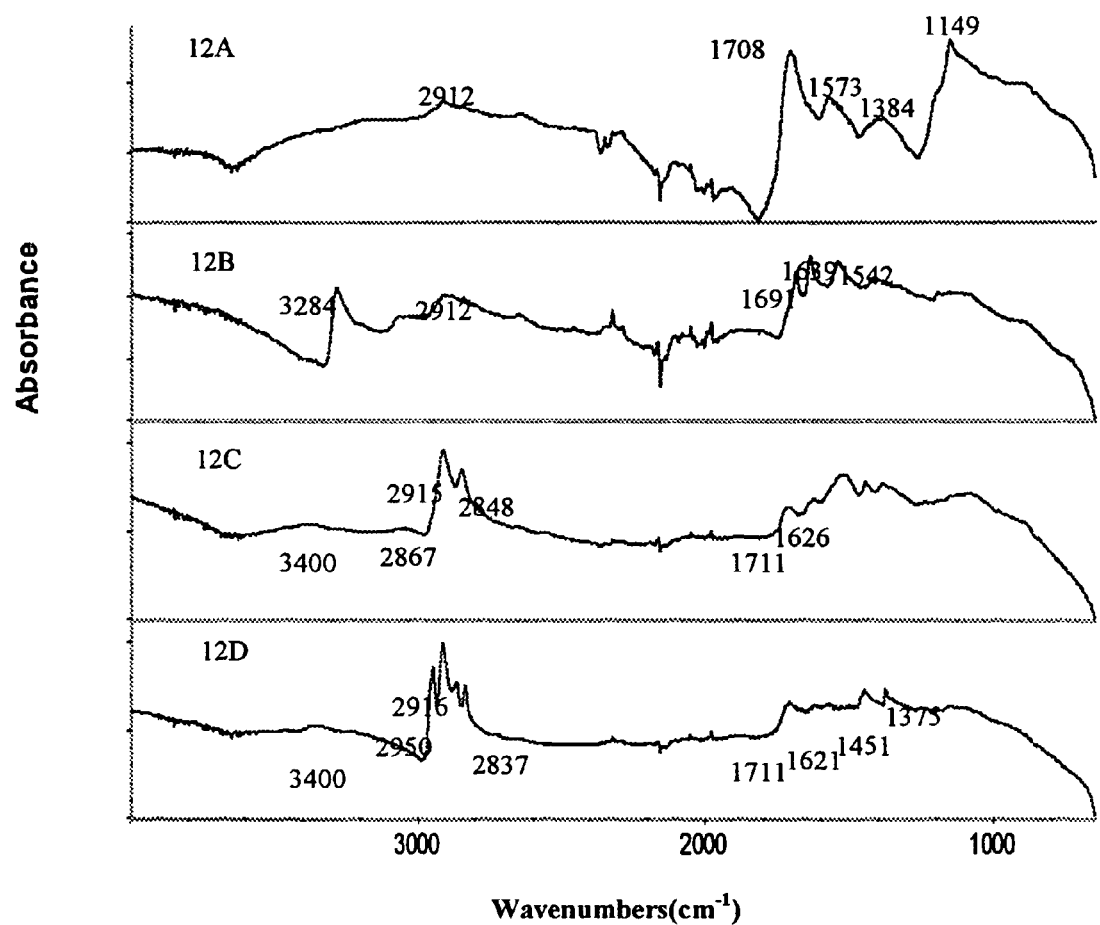
FIG. 12 shows FTIR spectra for certain embodiments of the present invention including spectra for the following sidewall-derivatized SWNT, wherein the subscript "x" indicates a number of sidegroup attachments which is variable depending on the sidegroup and conditions of preparation.

FIG. 12 shows FTIR spectra for certain embodiments of the present invention, wherein the subscript "x" indicates a variable number of sidegroup attachments that is variable depending on the sidegroup and conditions of preparation:
1) SWNT-(CH$_2$CH$_2$COOH)$_x$ (FIG. 12A);
2) SWNT-(CH$_2$CH$_2$CONHCH$_2$CH$_2$NH$_2$)$_x$ (FIG. 12B);
3) SWNT-(CH$_2$CH$_2$CONHC$_6$H$_{10}$CH$_2$C$_6$H$_{10}$NH$_2$)$_x$ (FIG. 12C); and
4) SWNT-(CH$_2$CH$_2$CONHC$_6$H(C$_2$H$_5$)$_2$CH$_3$NH$_2$)$_x$ (FIG. 12D).

The Raman spectrum of purified SWNT, given in FIG. 11A, shows a tangential mode shift at 1594 cm$^{-1}$ and radial breathing mode shifts at 213, 230 and 265 cm$^{-1}$, indicative of SWNT nanotube diameters in the range of about 0.7 nm and about 1.2 nm.

Raman (FIGS. 11B and 11C) and IR (FIG. 12A) spectra of sidewall functionalized SWNT indicated the presence of aliphatic functionality. When organic groups were attached to the SWNT sidewall such as in the case of SWNT-(CH$_2$CH$_2$COOH)$_x$ (7a), a prominent Raman peak appearing at ~1296 cm$^{-1}$ (see FIG. 11B) indicates a disruption in the aromatic π-electron system of the sp$^2$ carbon hybridization (i.e., sp$^3$ hybridization is occurring at the points of reaction). The breathing mode peaks were weaker in the sidewall functionalized spectrum versus pristine SWNT. The Raman spectrum of SWNT-(CH$_2$CH$_2$CH$_2$COOH)$_x$ (7b), is shown in FIG. 11C, is similar to that of 7a (FIG. 11B) except that the sp$^3$ mode peak at ~1296 cm$^{-1}$ showed a slightly lower intensity which was attributed to a somewhat lower number of organic groups attached to the nanotube sidewall surface for 7b compared to 7a.

No van Hove band structure was observed for sidewall functionalized SWNT 7a and 7b by UV-Vis-NIR. The van Hove band structure is typically observed with pristine SWNT.

The sidewall functional groups were removed by heating sidewall functionalized SWNT 7a and 7b in argon up to a temperature of 800° C. at 10° C./min in a TGA system. The defunctionalization of the sidewall derivatized SWNT was evidenced by both weight loss and Raman spectra analyses. The Raman spectra of the nanotube material collected after the pyrolysis showed a dramatic reduction of the Sp$^3$ carbon mode intensity, (see FIG. 11D) which is indicative of defunctionalization.

Although IR spectra of pristine SWNT are featureless, ATR-FTIR spectroscopy of sidewall-functionalized SWNT showed features, such as in IR spectrum of the SWNT-derivative 7a shown in FIG. 12A. The peaks in the 2800-3050 cm$^{-1}$ region indicate C—H stretches and a broad shoulder band in the 3100-3600 cm$^{-1}$ range indicate acidic O—H stretches. The dominant peak at 1708 cm$^{-1}$ is attributed to the acid carbonyl stretching mode. The broad band at 1384 cm$^{-1}$ is attributed to C—H bending and a broad peak at 1149 cm$^{-1}$ to the C—O stretching modes. The IR spectrum for sidewall-functionalized 7b was similar.

Example 7

This example demonstrates the preparation of amine terminated sidewall-derivatized single-wall carbon nanotubes from sidewall-functionalized, carboxylic acid-terminated SWNT made using acyl peroxides.

Preparation of Sidewall-Functionalized Amide-SWNT 8

Sidewall-functionalized amide-SWNT 8 was prepared using acid-functionalized SWNT 7a according to the reaction scheme diagrammed in FIG. 7. 20 mg acid-functionalized SWNT 7a was placed into a dry 100-ml flask to which 20 ml thionyl chloride was added and the mixture stirred for 12 hours. The reaction mixture was then vacuum filtered through a 0.2 μm pore size membrane. A solid precipitate that collected on the membrane was flushed with copious amounts of dry acetone and then dried in air. The air-dried precipitate was then placed into a 100-ml flask containing 20 ml ethylenediamine (Aldrich), and stirred for 12 hours at room temperature. The stirred mixture was then poured into large amount of ethanol and sonicated for another 10 minutes. The sonicated mixture was filtered through a 0.2 μm pore size membrane and the precipitate flushed with copious amounts of ethanol. The precipitate, amide-functionalized SWNT 8, was collected on a membrane and dried overnight in a vacuum oven at 70° C.

Preparation of Sidewall-Functionalized Amide-SWNT 9

A similar procedure was applied for preparation of amide-functionalized SWNT 9, according to the reaction scheme diagrammed in FIG. 8, by using acid-functionalized SWNT 7b with $SOCl_2$ and 4,4'-methylenebis(cyclohexylamine) (Aldrich).

Preparation of Sidewall-Amide-Functionalized SWNT 10

A similar procedure was applied for preparation of amide-functionalized SWNT 10, according to the reaction scheme diagrammed in FIG. 9, by using acid-functionalized SWNT 7b with $SOCl_2$ and diethyltoluenediamine (Aldrich). Unlike the reactions with ethylene diamine, given in FIG. 7, and 4,4'-ethylenebis(cyclohexylamine), given in FIG. 8, which proceeded at room temperature, the synthesis of amide-functionalized SWNT 10 from 7b required heating at 120° C. for 12 hours during the reaction with diethyltoluenediamine.

Analysis of Sidewall-Amide-Functionalized SWNT 8, 9 and 10

IR: A Thermo Nicolet Nexus 870 FTIR system with ATR capability was used to obtain ATR-FTIR spectra. UV-Vis-NIR spectra were obtained using a Shimadzu 3101 PC UV/Vis/NIR spectrometer. The FTIR spectrum (FIG. 12B) of SWNT-$(CH_2CH_2CONHCH_2CH_2NH_2)_x$ 8 (See FIG. 7) shows an intense peak at 3284 $cm^{-1}$ which was assigned to the N—H stretching mode of the amide moiety. The carbonyl peak in 8 downshifts to 1691 $cm^{-1}$ with respect to 7a as a result of the C(=O)NH linkage formation. The latter is also characterized by the in-plane amide NH deformation mode observed at 1542 $cm^{-1}$. The prominent peak at 1639 $cm^{-1}$ was assigned to the $NH_2$ scissoring mode in 8. The C—H stretchings in 8 are only slightly enhanced as compared to 7a, the spectrum of which is given in FIG. 12A.

The SWNT-derivative 7b was readily converted into an amide derivative 9 by $SOCl_2$ and 4,4'-methylenebis(cyclohexylamine) at room temperature in accordance with the reaction in FIG. 8. In the IR spectrum of 9, shown on FIG. 12C, the features of the methylene C—H stretches at 2915 and 2848 $cm^{-1}$ are greatly enhanced. The peak at 1711 $cm^{-1}$ and the broad band at ~3400 $cm^{-1}$ were assigned to the C=O and N—H stretching modes, respectively. The $NH_2$ scissor motion was associated with the peak at 1626 $cm^{-1}$.

The amidation reaction, shown in FIG. 9, of diethyltoluenediamine with 7b was negligible at room temperature, but proceeded upon heating at 120° C. to yield the sidewall-wall functionalized SWNT 10, whose IR spectrum is shown on FIG. 12D. The bands at 2950 and 2867 $cm^{-1}$, as well as those at 2916 and 2837 $cm^{-1}$ were assigned to CH stretches of the $CH_3$ and $CH_2$ groups, respectively. The carbonyl stretching peaks at 1711 $cm^{-1}$ and the NH stretching at ~3400 $cm^{-1}$ were weak. The bands at 1621, 1451 and 1375 $cm^{-1}$ were assigned to the $NH_2$ scissor, CH deformation and phenyl ring modes, respectively.

Figure 13:
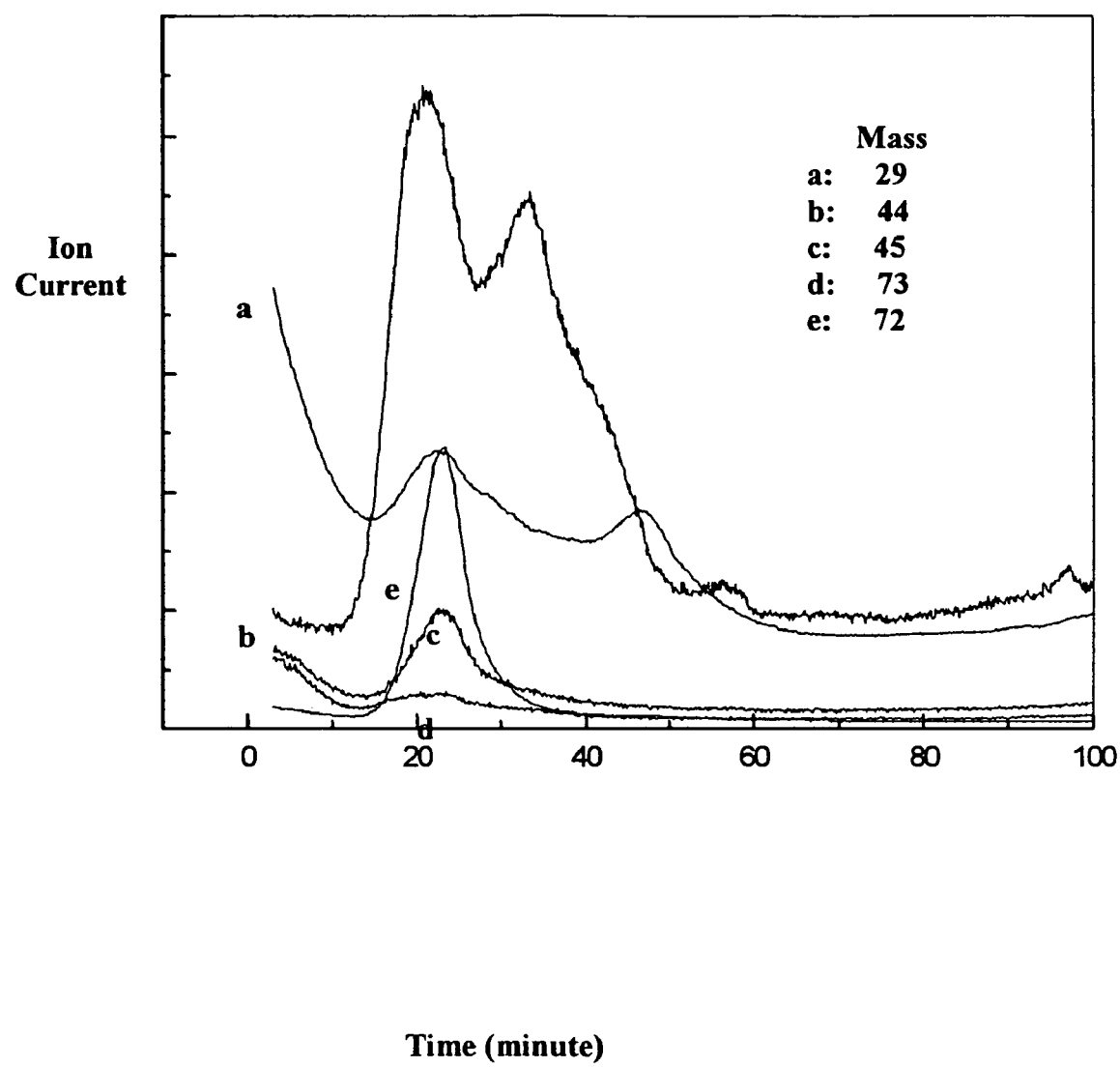
FIG. 13 shows TGA/MS of SWNT-$(CH_2CH_2COOH)_x$, with peak evolutions due to the following sidegroup fragments and associated atomic mass:
a: —$CH_2CH_3$ (mass: 29),
b: —COO— (mass: 44),
c: —COOH (mass: 45),
d: —$CH_2CH_2COOH$ (mass: 73) and
e: —$CH_2CH_2COO$— (mass: 72).

TGA/MS: Identification and quantification of thermal degradation and volatile products were performed with a TGA/MS instrument equipped with a Q500 Thermal Gravimetric Analyzer coupled with a Pffeifer Thermal Star mass spectrometer. TGA-MS (Thermal Gravimetric Analysis-Mass Spectroscopy) provided evidence for covalent attachment of alkyl-carboxyl sidewall functionalized SWNT 7a and 7b. TGA was conducted over a range of 50-800° C. using 15 mg of 7a or 7b placed into a TGA pan and heated at 10° C./min up to 800° C. under an argon flow. FIG. 13 presents ion current versus time curves for molecular and fragment ions originating from the evolution products detaching from the 7a sidegroups. FIG. 13 shows TGA/MS of SWNT-$(CH_2CH_2COOH)_x$, with peak evolutions due to the following sidegroup fragments and associated atomic mass: a: —$CH_2CH_3$ (mass: 29); b: —COO— (mass: 44); c: —COOH (mass: 45); d: —$CH_2CH_2COOH$ (mass: 73); and e: —$CH_2CH_2COO$— (mass: 72). The evolution curves were obtained for the parent ion (m/z 73) of the detaching $CH_2CH_2COOH$ radical, and fragment ions with the m/z 72 {$CH_2CH_2COO$}, m/z 45 {COOH}, m/z 44 {COO}, and m/z 29 {$CH_3CH_2$}. That all curves for the fragment ions have the same evolution temperature indicates that the fragments originated from the same parent molecular ion.

For 7a SWNT-$(CH_2CH_2COOH)_x$, fragment evolutions started at about 170° C. which is comparable to that of methylated, butylated and hexylated SWNT (~160° C.) and relatively lower than phenylated SWNT (~250° C.). Assuming that all weight loss was due to sidegroup detachment, the number of sidewall functional groups was estimated to be one functional group for every 24 nanotube carbons for 7a.

Solid State NMR: Solid state MAS (Magic Angle Spinning) NMR spectra were obtained with a Bruker (50.3 MHz $^{13}C$, 200.1 MHz $^1H$) NMR spectrometer. MAS spectra were obtained by packing each sample in a 4-mm OD (outer diameter) rotor and spinning at 7.5 kHz in the case of pristine SWNT and at 11.0 kHz for functionalized SWNT. The spinning sidebands appeared well outside the $sp^2$ and $sp^3$ centerband regions of interest (149 ppm upfield or downfield from the centerband in case of SWNT and 219 ppm upfield or downfield from a centerband for functionalized SWNT). Each spectrum was obtained with a 4.5-μs 90° $^{13}C$ pulse and a 32.9-ms, proton-decoupled FID, followed by a 180-s relaxation delay for pristine SWNT or a 45-s relaxation delay for sidewall-functionalized SWNT. A total of 1320 scans (66.0 hr) were averaged for pristine SWNT, 7152 scans (89.5 hr) for the SWNT-derivative 7a, 4984 scans (62.3 hr) for 7b, and 3560 scans (44.5 hr) for the SWNT amide derivative 8. Each FID (free induction decay) was processed with 50 Hz (1 ppm) of line broadening. The resulting spectrum was phase corrected. A fourth-order polynomial was then applied to the baseline over the region from δ 315 to −70 ppm to create a nearly flat baseline after the polynomial was subtracted from the spectrum.

A functionalized $C_{60}$ sample, $C_{60}$—$(CH_2CH_2COOH)_n$, was used to estimate the relative relaxation rates of the various types of carbons in the sample. For this estimate, a 7-mm OD rotor was filled with $C_{60}$—$(CH_2CH_2COOH)_n$ and spun at 7.0 kHz. A spectrum was obtained with a 3.8-μs 90° $^{13}C$ pulse and a 32.9-ms, proton-decoupled FID, followed by either a 15-s relaxation delay (10,440 scans, 43.6 hr) or a 45-s relaxation delay (2132 scans, 26.7 hr).

Figure 14:
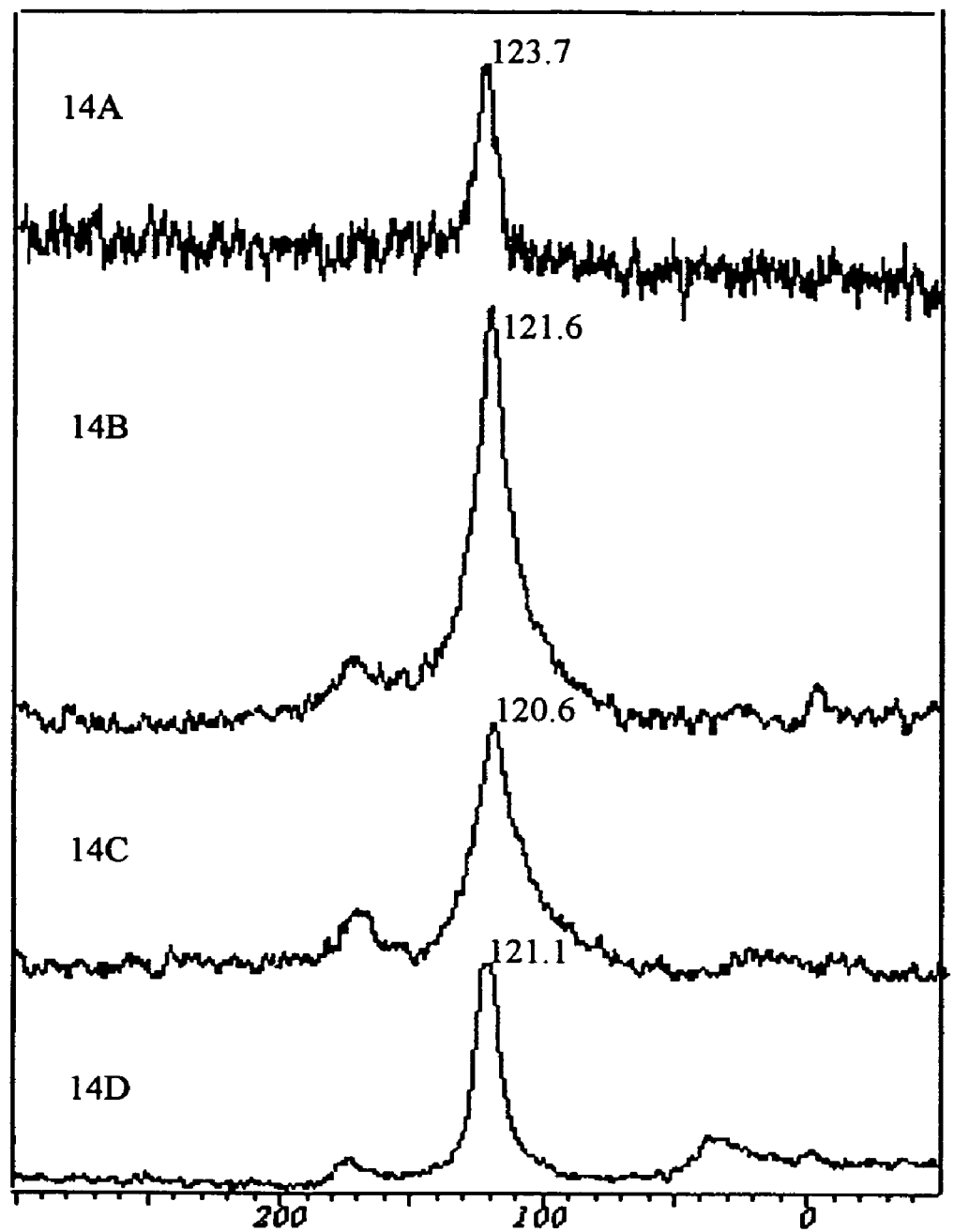
FIG. 14 shows $^{13}C$ NMR spectra for certain embodiments of the present invention including spectra for the following pristine and sidewall-derivatized SWNT, wherein the subscript "x" indicates a number of sidegroup attachments which is variable depending on the sidegroup and conditions of preparation.

FIG. 14 shows $^{13}C$ NMR spectra for pristine SWNT and certain embodiments of the present invention, wherein the subscript "x" indicates a variable number of sidegroup attachments which is variable depending on the sidegroup and conditions of preparation:

1) pristine HIPCO SWNT (FIG. 14A);
2) SWNT-(CH$_2$CH$_2$CH$_2$COOH)$_x$ (FIG. 14B);
3) SWNT-(CH$_2$CH$_2$COOH)$_x$ (FIG. 14C); and
4) SWNT-(CH$_2$CH$_2$CONHCH$_2$CH$_2$NH$_2$)$_x$ (FIG. 14D).

In FIG. 14A, $^{13}$C NMR showed a narrow isotropic peak at ~δ123 ppm for purified, pristine HIPCO SWNT. Sidewall functionalization with —(CH$_2$)$_n$COOH, n=2 or 3, (7a or 7b, respectively) resulted in a broadening and slightly upfield shift for the peak (FIGS. 14B and 14C). Functionalization also resulted in a carbonyl signal at about δ172 ppm, which, although broader than the CPMAS carboxyl signal of the precursor peroxide and exceptionally shielded for a carboxylic acid, was corroborated by an IR absorption at 1708 cm$^{-1}$ consistent with a carboxylic acid. Although not meant to be held by theory, the π-system of the nanotube itself may exert a shielding and broadening effect on the carbonyl carbon of the substituent. For sidewall functionalized SWNT-(CH$_2$CH$_2$COOH)$_x$ 7a, a very weak broad signal consistent with aliphatic carbon is centered at about δ20 ppm, while for SWNT-(CH$_2$CH$_2$CH$_2$COOH)$_x$ 7b, signals from aliphatic carbons are essentially undetectable. For sidewall-functionalized SWNT-(CH$_2$CH$_2$CONHCH$_2$CH$_2$NH$_2$)$_x$ 8, the nanotube has little effect on the methylene signal. The amide group gives a signal at ~δ174 ppm. Signals from the methylene carbons are stronger than in the SWNT-(CH$_2$CH$_2$COOH)$_x$ and SWNT-(CH$_2$CH$_2$CH$_2$COOH)$_x$, 7a and 7b, respectively. The increased intensity is attributed to the relatively remote, with respect to the nanotube, NHCH$_2$CH$_2$NH$_2$ methylene carbons, whose signals are somewhat upfield shifted.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for functionalizing carbon nanotubes, said method comprising:
    (a) decomposing an acyl peroxide to form carbon-centered free radicals;
        wherein the acyl peroxide has a form of R—C(O)O—O(O)C—R';
        wherein R and R' are the same or different; and
        wherein the carbon-centered free radicals are formed from the acyl peroxide and have a form of .R and .R'; and
    (b) reacting the carbon-centered free radicals with the carbon nanotubes to form functionalized carbon nanotubes;
        wherein reacting comprises forming carbon-carbon bonds between the carbon nanotubes and the carbon-centered free radicals.

2. The method of claim 1, wherein the functionalized carbon nanotubes are sidewall-functionalized carbon nanotubes.

3. The method of claim 1, wherein .R and .R' are the same and the functionalized carbon nanotubes comprise R and R' bonded to a sidewall of the carbon nanotubes.

4. The method of claim 3, wherein the R and R' comprise a range of 1 to about 30 carbon atoms.

5. The method of claim 1 wherein .R and .R' are different and the functionalized carbon nanotubes comprise R and R' bonded to a sidewall of the carbon nanotubes.

6. The method of claim 5, wherein R and R' comprise a range of 1 to about 30 carbon atoms.

7. The method of claim 1, wherein the carbon nanotubes are selected from the group consisting of single-wall carbon nanotubes, multi-wall carbon nanotubes and combinations thereof.

8. The method of claim 1, wherein the carbon nanotubes are sidewall-fluorinated carbon nanotubes.

9. The method of claim 1, wherein the acyl peroxide is selected from the group consisting of acetyl peroxide, n-butyryl peroxide, sec-butyryl peroxide, t-butyryl peroxide, t-pentoyl peroxide, iso-valeryl peroxide, valeroyl peroxide, furoyl peroxide, palmitoyl peroxide, decanoyl peroxide, lauroyl peroxide, cyclopropanoyl peroxide, cyclobutanoyl peroxide, cyclopentanoyl peroxide, trans-t-butylcyclohexanoyl peroxide, trans-4-cyclohexanecarbonyl peroxide, diisopropyl peroxydicarbonate, butylperoxyisopropyl carbonate, cyclohexyl peroxydicarbonate, an acyl peroxide having terminal carboxylic acid groups, and combinations thereof.

10. The method of claim 1, wherein the acyl peroxide is an aroyl peroxide.

11. The method of claim 10, wherein the aroyl peroxide is selected from the group consisting of benzoyl peroxide, cinnamoyl peroxide, bis(p-methoxybenzoyl) peroxide, p-monomethoxybenzoyl peroxide, benzoyl phenylacetyl peroxide, bis(o-phenoxybenzoyl) peroxide, acetyl benzoyl peroxide, t-butyl peroxybenzoate, p-nitrobenzoyl peroxide, p-bromobenzoyl peroxide, p-chlorobenzoyl peroxide, bis(2,4-dichlorobenzoyl) peroxide, p-methylbenzoyl peroxide, p-methoxybenzoyl peroxide, exo-norbornene-5-carbonyl peroxide, endo-norbornene-5-carbonyl peroxide and combinations thereof.

12. The method of claim 10, wherein the aroyl peroxide comprises benzoyl peroxide.

13. The method of claim 1, wherein (a) the acyl peroxide is an acyl dicarboxylic acid peroxide having a chemical formula of HO(O)C(CH$_2$)$_n$C(O)OO(O)C(CH$_2$)$_m$C(O)OH; (b) n is a number ranging from 1 to about 20; and (c) m is a number ranging from 1 to about 20.

14. The method of claim 13, wherein the acyl dicarboxylic acid peroxide is selected from the group consisting of succinic acid peroxide, glutaric acid peroxide, and combinations thereof.

15. The method of claim 1, wherein the acyl peroxide has terminal carboxylic acid groups, and wherein the method further comprises:
    reacting a chlorinating agent with the terminal carboxylic acid groups to form terminal acyl chloride groups.

16. The method of claim 15, wherein the chlorinating agent is selected from the group consisting of thionyl chloride, phosphorous trichloride, phosphorous pentachloride, oxalyl chloride and combinations thereof.

17. The method of claim 15, wherein the chlorinating agent is thionyl chloride.

18. The method of claim 15, further comprising:
    reacting an amine with the terminal acyl chloride groups to form amides.

19. The method of claim 18, wherein the amine is a diamine and the amides comprise a terminal amine.

20. The method of claim 18, wherein the amine is selected from the group consisting of an alkyl amine, an aryl amine and combinations thereof.

21. The method of claim 19, wherein the diamine is selected from the group consisting of an alkyl diamine, an aryl diamine and combinations thereof.

22. The method of claim 21, wherein the alkyl diamine comprises a cyclohexyl group.

23. The method of claim 19, wherein the diamine is selected from the group consisting of ethylene diamine, 4,4'methylenebis(cyclohexylamine), propylene diamine, butylene diamine, hexamethylene diamine and combinations thereof.

24. The method of claim 1, wherein the decomposing and reacting steps occur in a solid-state reaction.

25. The method of claim 1, wherein the decomposing and reacting steps occur when the carbon nanotubes and the acyl peroxide are dispersed in a solvent.

* * * * *